FIG. 9.

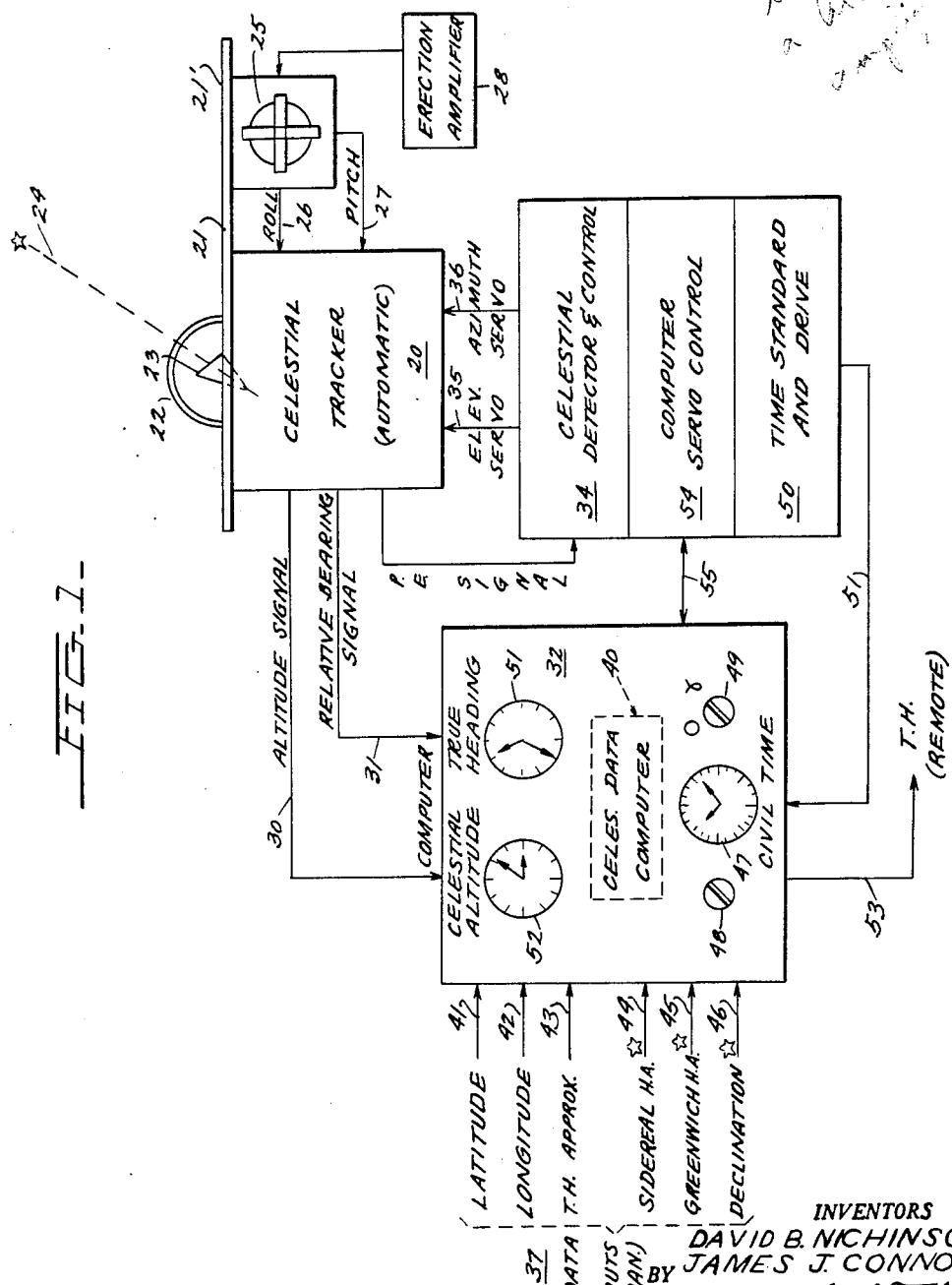

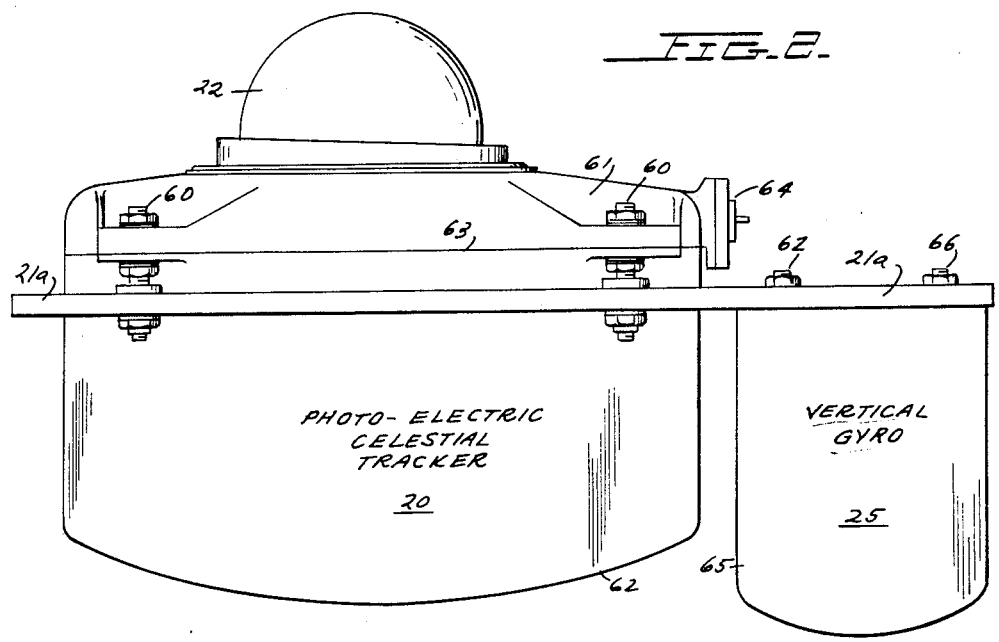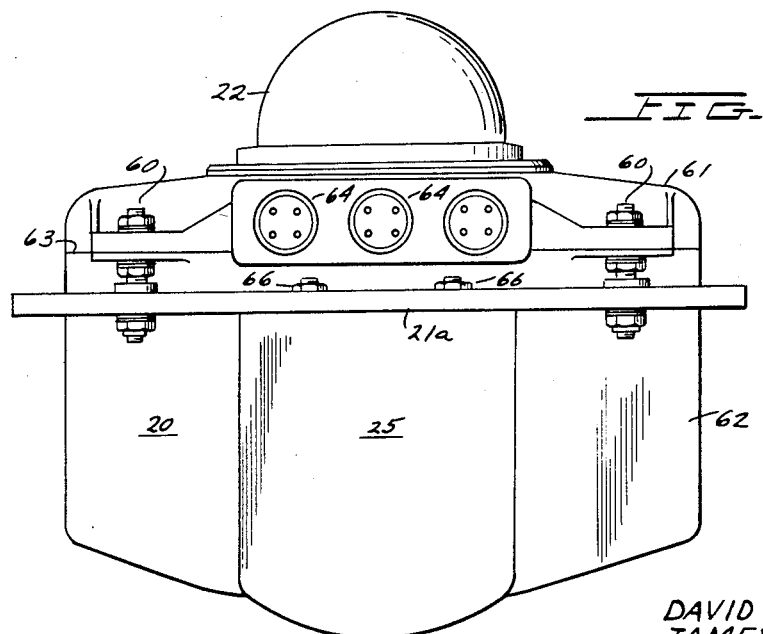

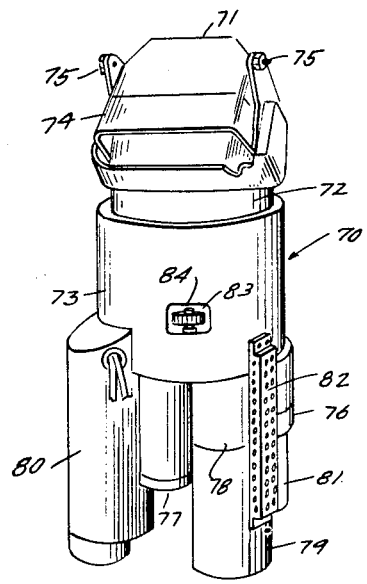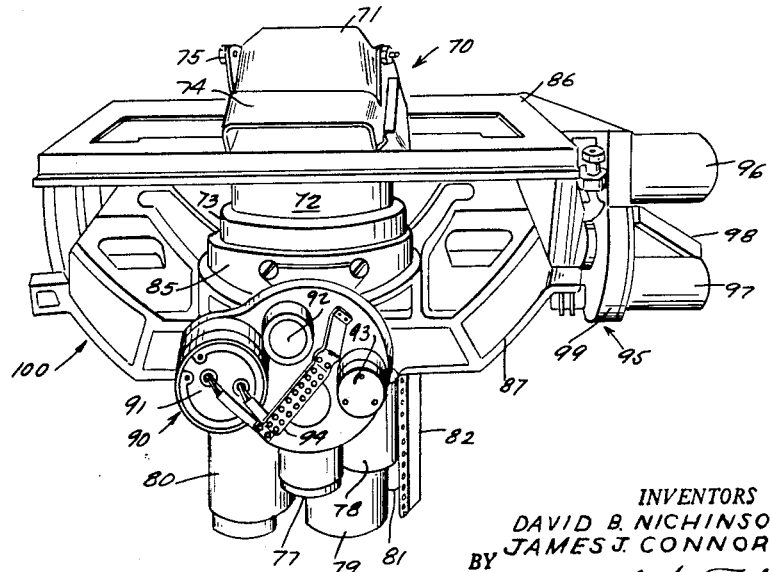

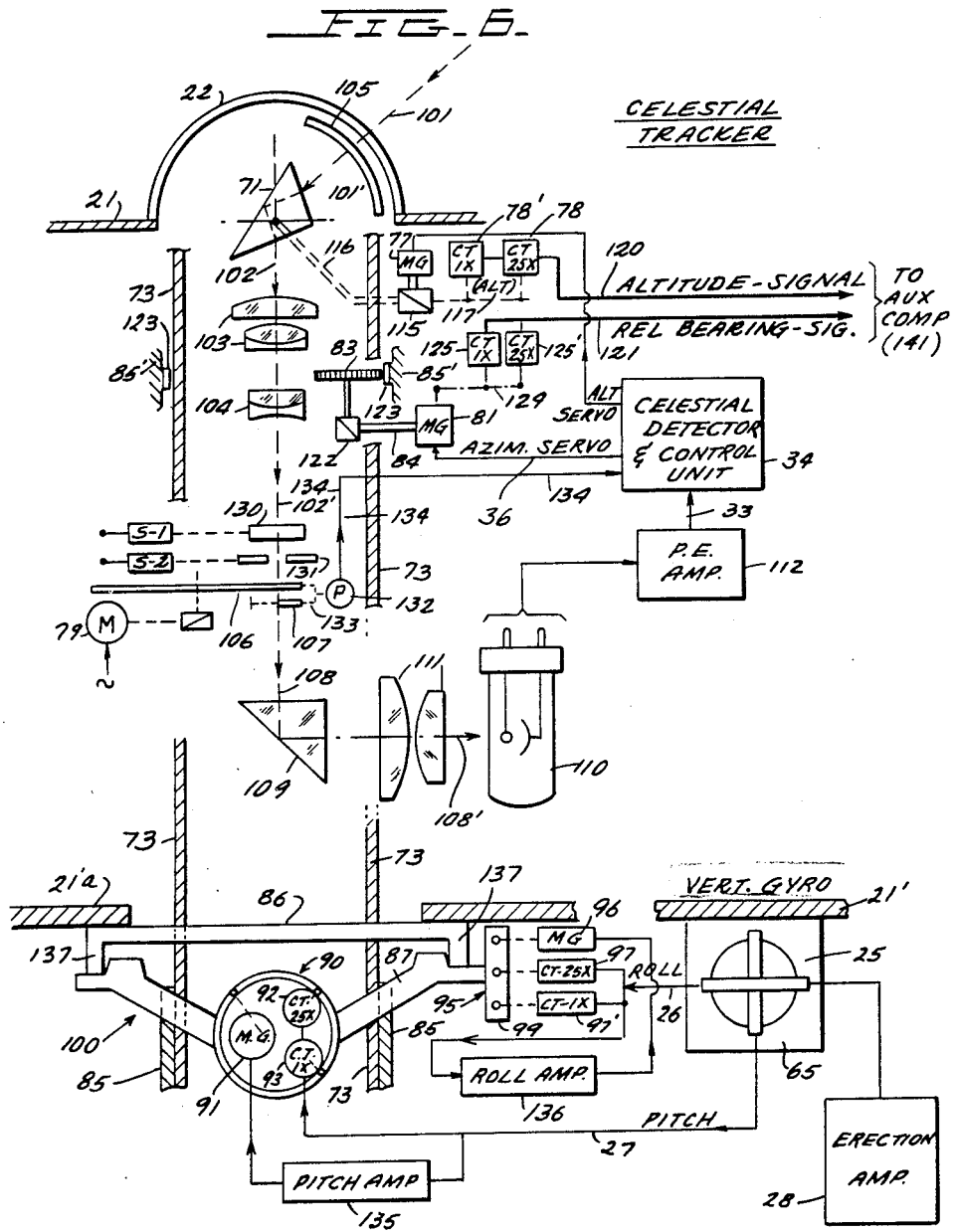

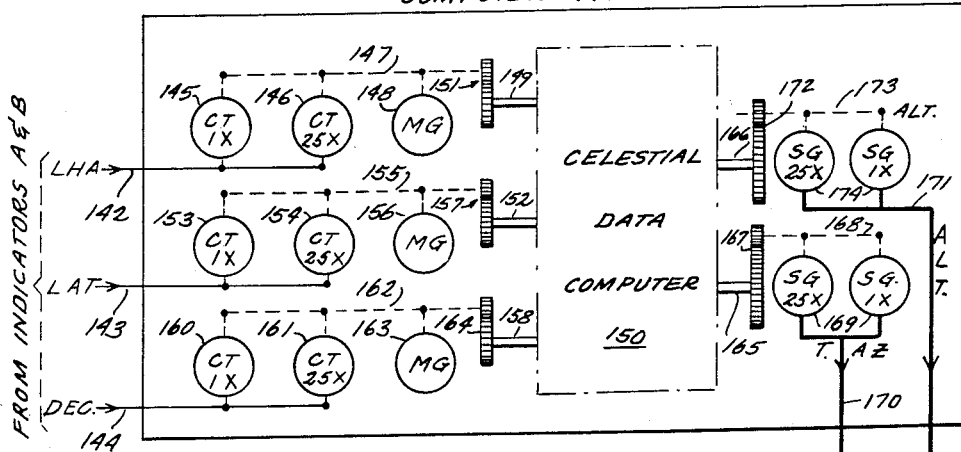

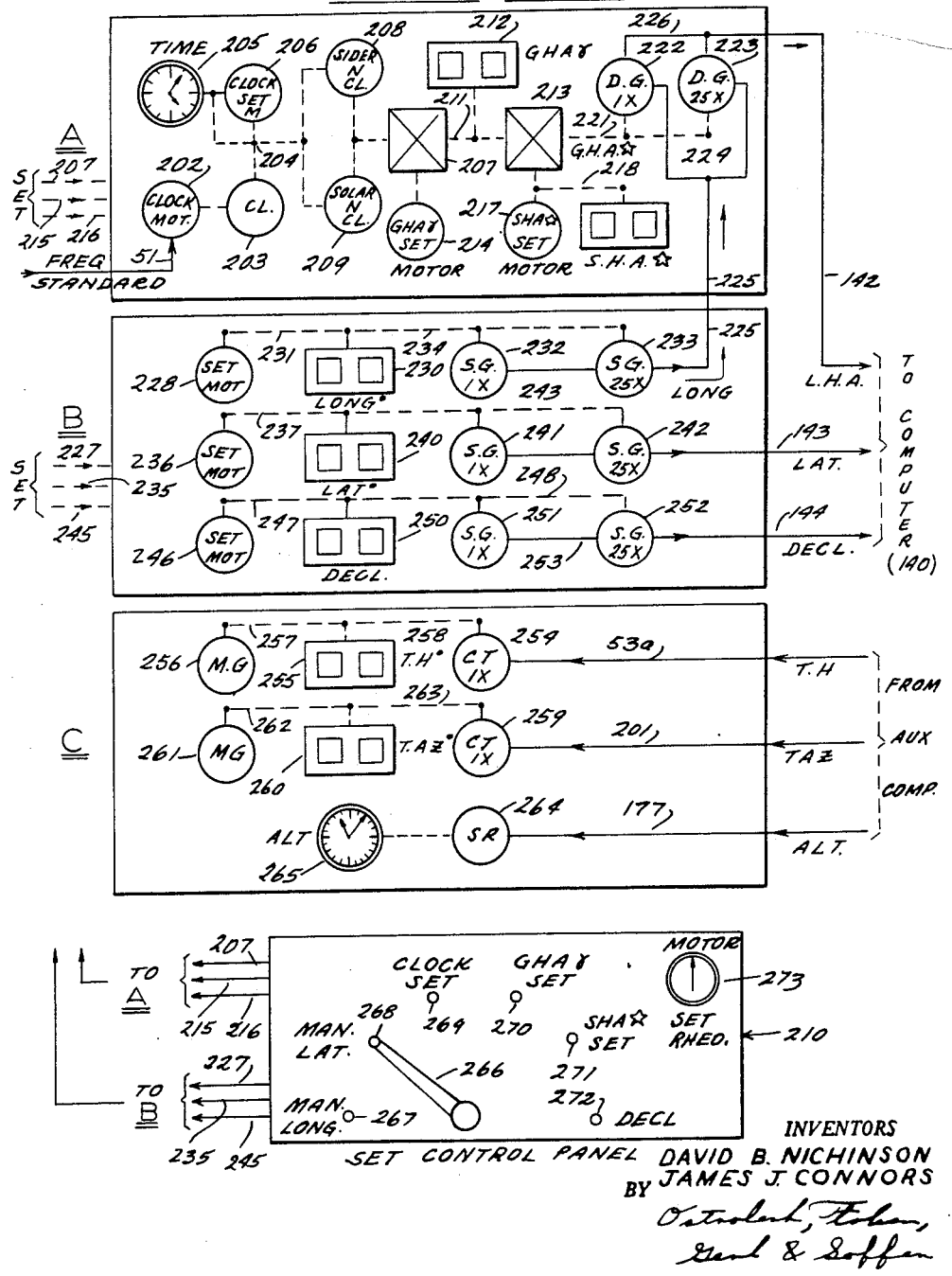

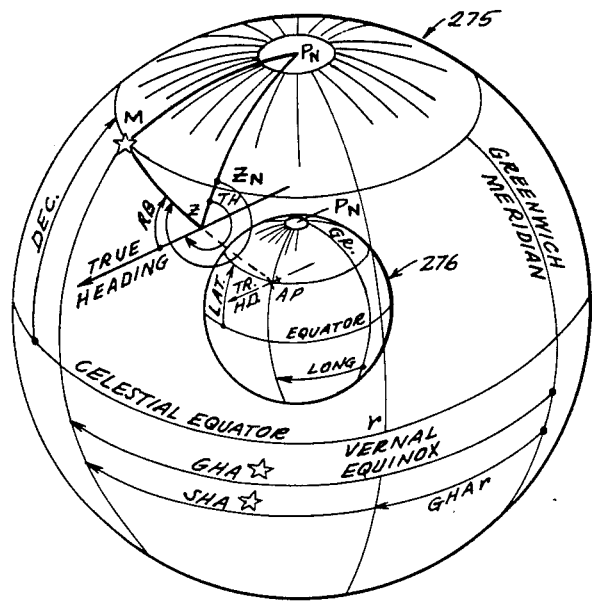

$Z_N$ - TRUE AZIMUTH OF CELESTIAL BODY
(SOLVED FOR IN COMPUTER)
RB - RELATIVE BEARING OF CELESTIAL BODY
(SOLVED FOR BY TRACKER)
TH - TRUE HEADING OF AIRCRAFT
(FINAL OUTPUT OF SYSTEM)
$Z_N - RB = TH$ $P_N$ - ELEVATED POLE
Z - ZENITH OF THE OBSERVER
M - CELESTIAL BODY
AP - ASSUMED POSITION OF OBSERVER ON EARTH
DEC. - DECLINATION, ANGULAR DISTANCE MEASURED FROM THE CELESTIAL EQUATOR TO THE CELESTIAL BODY
GHAγ - GREENWICH HOUR ANGLE OF ARIES MEASURED WESTWARD FROM GREENWICH MERIDIAN TO THE VERNAL EQUINOX
SHA☆ - SIDEREAL HOUR ANGLE OF THE CELESTIAL BODY MEASURED WESTWARD FROM THE VERNAL EQUINOX TO THE CELESTIAL BODY
GHA☆ - GREENWICH HOUR ANGLE OF THE CELESTIAL BODY MEASURED WESTWARD FROM GREENWICH MERIDIAN TO THE CELESTIAL BODY.

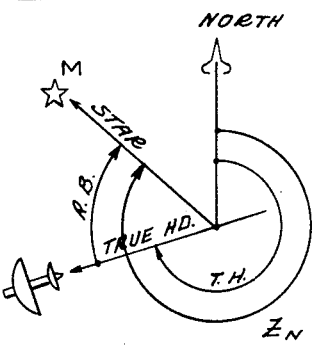

INVENTORS
DAVID B. NICHINSON
JAMES J. CONNORS
BY
Ostrolenk, Faber,
Gerb & Soffen
ATTORNEYS

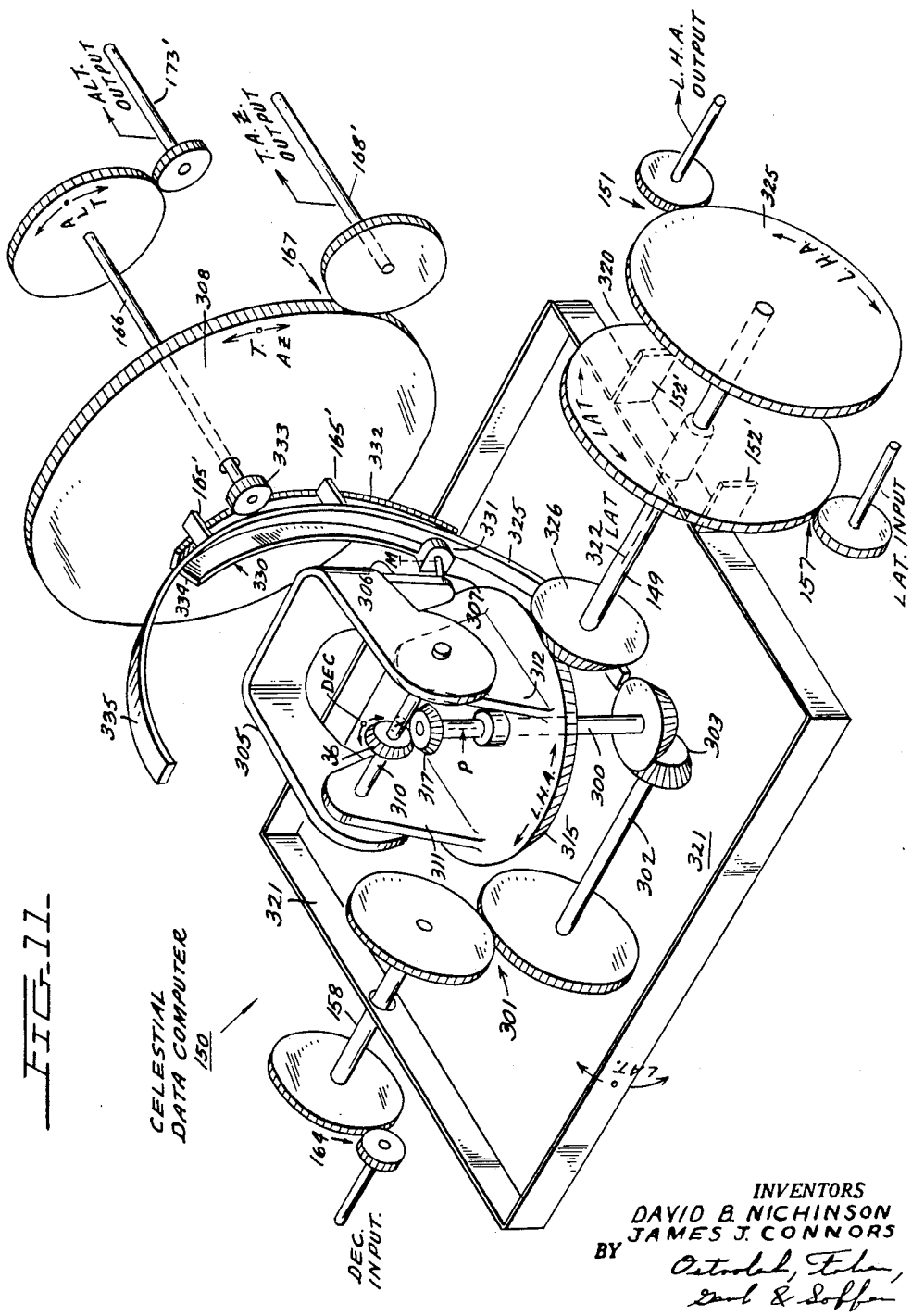

Aug. 29, 1961  D. B. NICHINSON ET AL  2,998,529
AUTOMATIC ASTROCOMPASS
Filed June 19, 1958  14 Sheets-Sheet 9
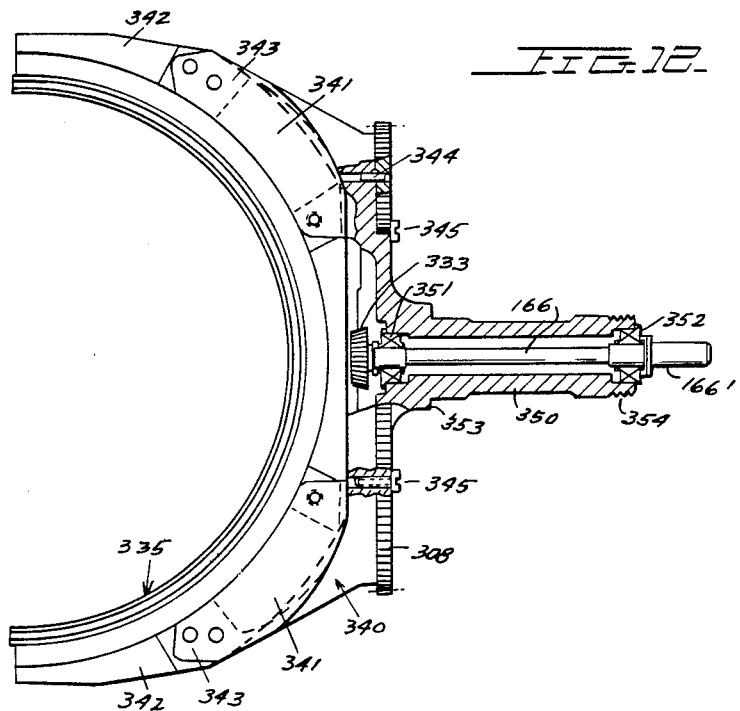
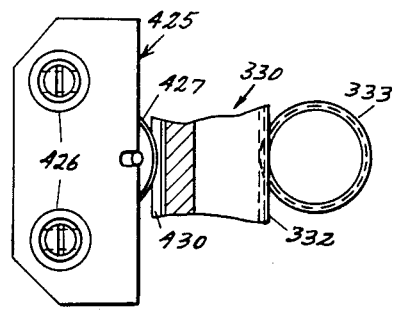
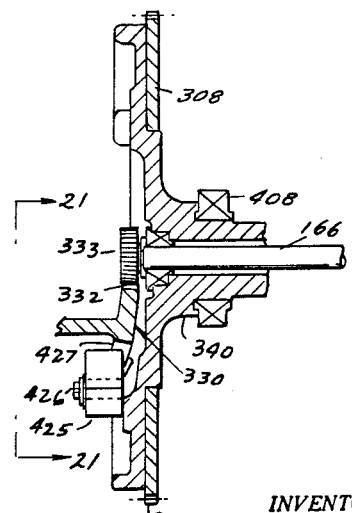
INVENTORS
DAVID B. NICHINSON
BY JAMES J. CONNORS
ATTORNEYS

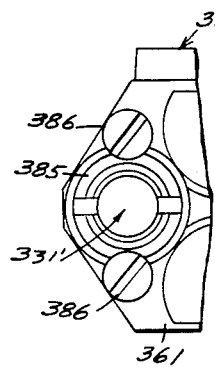
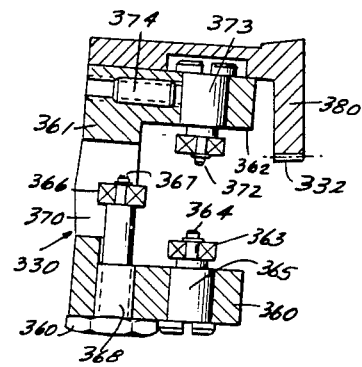
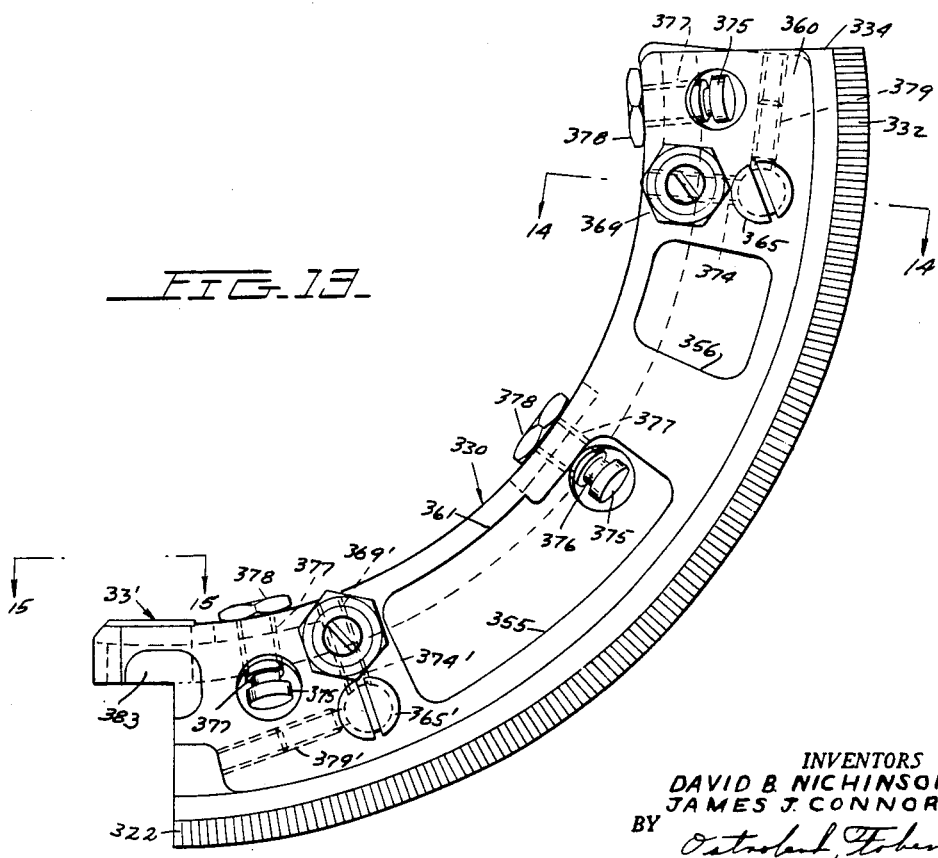
INVENTORS
DAVID B. NICHINSON
JAMES J. CONNORS
BY
ATTORNEYS Aug. 29, 1961 D. B. NICHINSON ET AL 2,998,529
AUTOMATIC ASTROCOMPASS
Filed June 19, 1958 14 Sheets-Sheet 11

INVENTORS
DAVID B. NICHINSON
JAMES J. CONNORS
BY
ATTORNEYS

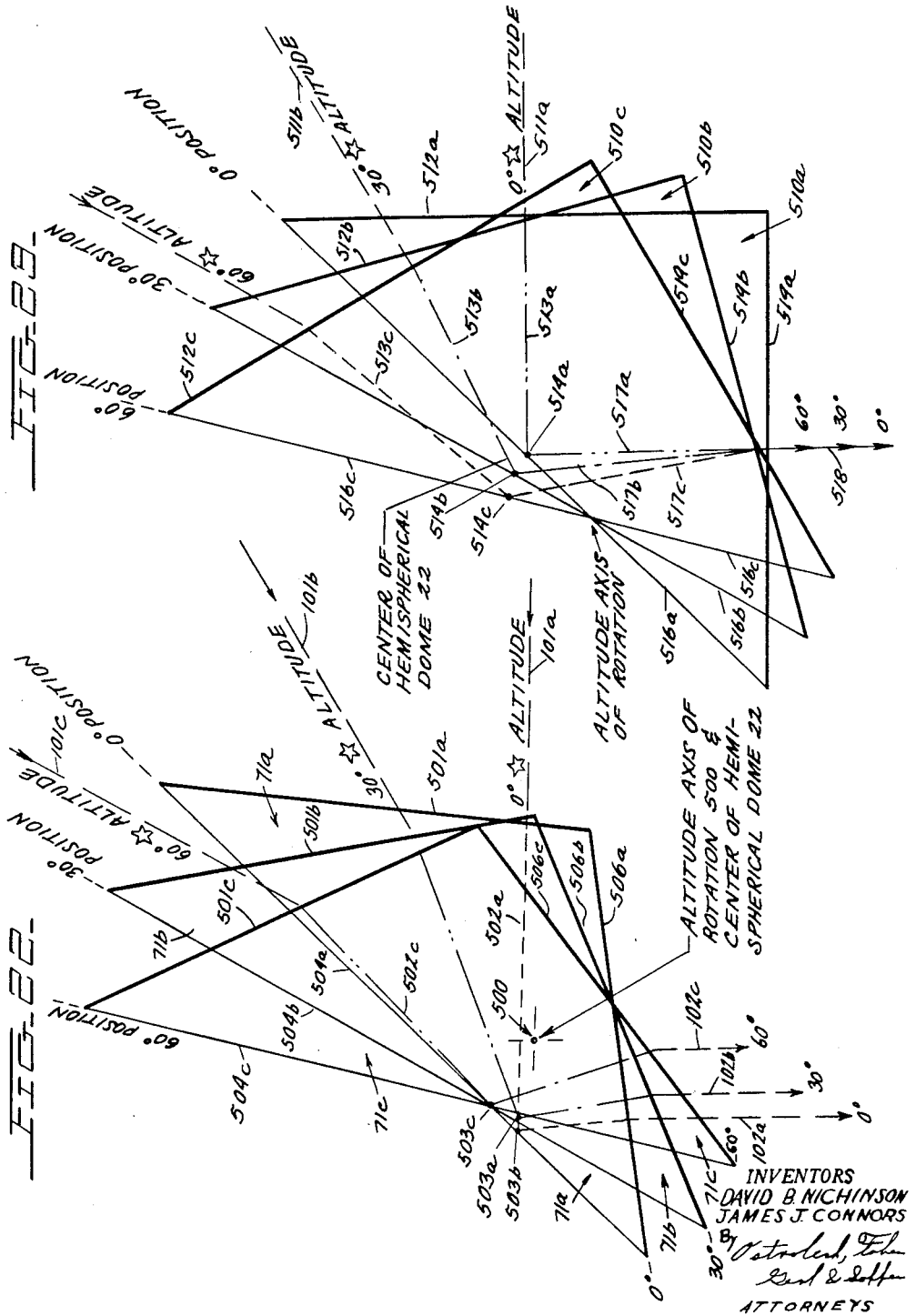

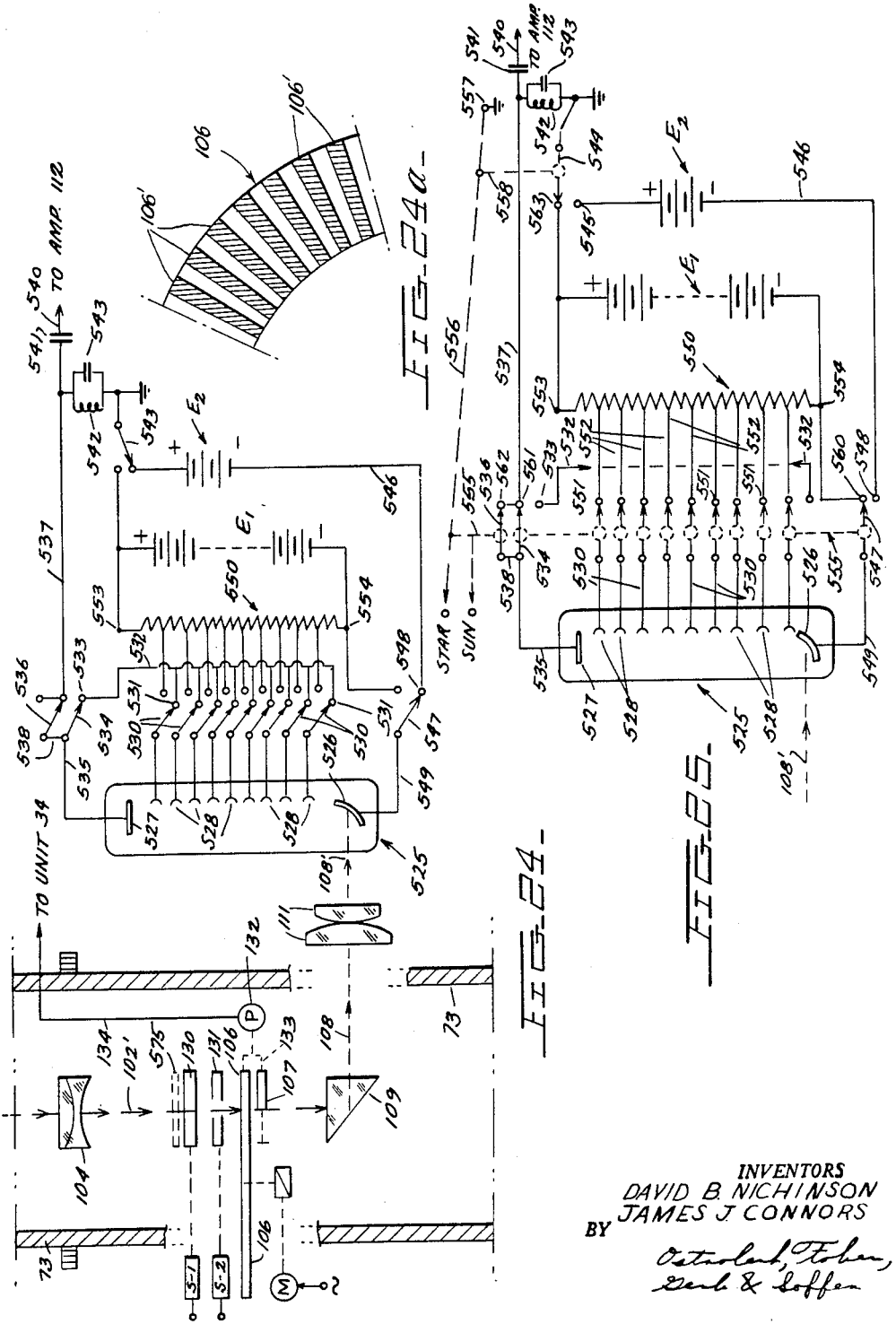

Aug. 29, 1961     D. B. NICHINSON ET AL     2,998,529
AUTOMATIC ASTROCOMPASS

Filed June 19, 1958     14 Sheets-Sheet 14

FIG. 28.

LEGEND
$P_o$ = POINT OF DEPARTURE
$\alpha$ = WIND DRIFT ANGLE
$S$ = FIRST ASSUMED POSITION
$T$ = ACTUAL POSITION
$S'$ = SECOND ASSUMED POSITION
$T'$ = FINAL ACTUAL POSITION
$S''$ = FINAL ASSUMED POSITION
$Z_m$ = STAR AZIMUTH
$LOP$ = LINE OF POSITION

INVENTORS
DAVID B. NICHINSON
JAMES J. CONNORS
BY

ATTORNEYS

United States Patent Office 2,998,529
Patented Aug. 29, 1961

2,998,529
AUTOMATIC ASTROCOMPASS
David B. Nichinson, Great Neck, and James J. Connors, Bayside, N.Y., assignors to Kollsman Instrument Corporation, Elmhurst, N.Y., a corporation of New York
Filed June 19, 1958, Ser. No. 743,106
7 Claims. (Cl. 250—203)

This invention relates to navigational systems for vehicles and more particularly relates to a novel astrocompass that operates automatically aboard an aircraft.

It is a primary object of the present invention to provide an astrocompass which automatically and continuously affords precise aircraft heading by electronic tracking of a celestial body, such as the sun during the day, or a star or planet during the night.

In accordance with the present invention, a celestial body is automatically tracked with photoelectric means to provide accurate information as to relative bearing of the vehicle as well as altitude to a selected celestial body. The celestial body is sighted and continuously tracked by a photoelectric sextant system such as shown and described in copending patent application Serial No. 560,743, filed January 23, 1956, now Pat. No. 2,941,082, assigned to the same assignee as the present case. Such photoelectric sextant provides the relative bearing and altitude measurements with a minimum of human attendance, and more accurately than can be determined with a hand-operated sextant. The sighting prism of the photoelectric sextant protrudes from the aircraft frame within a transparent dome. The sextant prism is remote from the navigator or pilot and is controlled through servomechanisms.

The photoelectric sextant employed in the present invention is provided with a gyro-stabilized platform. A vertical gyro-scope in conjunction with an erection amplifier and servomechanism horizontally stabilizes the sextant mounting to ensure a true vertical reference for the system in a fast moving vehicle. The horizontally stabilized platform for the automatic sextant overcomes the necessity of averaging out a number of readings which is required in manually operated systems and provides continuous precise vehicle heading measurements, as well as altitude of the sighted celestial body.

The present invention further provides a continuous automatic celestial data computer, combined and coordinated with the output measurement signals of the automatic photoelectric sextant to produce accurate continuous true heading indications of the aircraft, as well as readings of the true azimuth and altitude of the observed celestial body. For a particular geographical position and time, the relative orientation of any celestial body can be computed. The orientation is defined by two terms: true azimuth, which is the angular distance from north in a horizontal plane; and altitude, which is the angular distance from the horizon in a vertical plane.

The data computer of the present invention utilizes a mechanical analog mechanism which correlates geographic position and the celestial data of a selected celestial body and provides a continuous basic output of the celestial body's azimuth and altitude measurements. In a specific embodiment a five axis data computer mechanizes the input data including: the geographical position of latitude and longitude; an initial setting in the computer of the Greenwich hour angle of Aries; and the celestial coordinates of the sun or a selected star, namely, sidereal hour angle and declination.

In the actual mechanization, to help initially orient the celestial tracker, an approximate value of relative bearing is obtained by combining the computer azimuth with a general approximation of heading. The computer altitude and the approximate value of relative bearings are used to direct the sighting of the photoelectric tracker. These coordinates are referenced to the horizontal plane, and the tracker is supported in a platform horizontally stabilized along the roll and pitch axes. With acquisition of the star, the photoelectric tracking provides the precise measurement of altitude and relative bearing. The measured relative bearing, combined with the true azimuth computed by the celestial data computer, furnishes the desired true heading of the aircraft.

An important object of the present invention is to provide an automatic astrocompass which when preset with data as to approximate geographic position of the vehicle and the celestial coordinates of a selected celestial body, together with an initial setting of the Greenwich hour angle of Aries, acquires and tracks the selected body through an automatic sextant which continuously computes the true azimuth and altitude of the celestial body; and which combines the computer data with the celestially tracked data to produce a continuous output reading of true heading of a moving aircraft.

A further object of the present invention is to provide an automatic astrocompass which affords true heading readings of a moving vehicle over a protracted period.

Still another object of the present invention is to provide an automatic astrocompass combining an automatic tracker of a celestial body with a mechanical analog computer of the celestial body true azimuth and combines the tracker and computer celestial readings to provide precise continuous true heading readings of a fast moving vehicle upon which the system is mounted.

Still a further object of the present invention is to provide an automatic astrocompass which automatically tracks a selected celestial body by means remotely stationed from the pilot or navigator, in conjunction with a remotely stationed data computer of celestial position, and provide true heading and altitude readings from the remote astrocompass to the pilot or navigator position.

Another object of the present invention is to provide an automatic astrocompass having an automatic photoelectric sextant with a horizontally gyro stabilized platform to afford a vertical reference for the compass system, and a mechanical data computer which correlates the photo-electric sextant readings with the celestial body data coordinates to continuously provide precise true heading indications of a fast moving vehicle.

An additional use of the automatic astrocompass of the present invention is in the determination of lines of position and a celestial fix by the aircraft navigator. In the determination of a line of position, the operation is essentially the same as described hereinabove for true heading, except that the photoelectrically measured altitude by the automatic sextant is important, while the measurement of relative bearing provided by the astrocompass is not utilized therefor. In this mode of operation the measured or observed altitude of the celestial body is compared to the data computed values of altitude and azimuth, predicated on the assumed position. In determining the line of position, only approximate geographic position is required. In the data computer of the present invention, novel means are provided for picking off the computed altitude of the selected celestial body and which value of the body altitude is translated and coordinated with the photoelectrically tracked or observed celestial altitude.

Accordingly, another important feature of the present invention is to provide a computer altitude indication from the mechanical celestial data computer.

Still a further object of the present invention is to correlate computed altitude indications of a celestial body with the observed or photoelectrically measured altitude of the same body.

The above and further objects of the present invention will become more apparent from the following description of an exemplary embodiment thereof, illustrated in the drawings in which:

FIGURE 1 is a schematic block diagram of the overall automatic astrocompass system of the present invention.

FIGURE 2 is a front elevational view of the photoelectric tracker of the invention system.

FIGURE 3 is a side elevational view of the photoelectric tracker of FIGURE 2.

FIGURE 4 is a perspective illustration of the photoelectric sextant altitude-relative bearing tracker.

FIGURE 5 is a perspective illustration of the photoelectric tracker mounted in a horizontally stabilized platform.

FIGURE 6 is a diagrammatic illustration of the celestial photoelectric tracker system, together with the horizontal stabilized platform arrangement thereof.

FIGURE 7 is a schematic diagram of the celestial computer and auxiliary computer of the astrocompass system.

FIGURE 8 is a diagrammatic representation of the indicator panels and the associated servomechanisms, including the set control panel for the various indicators.

FIGURE 9 illustrates the celestial sphere and the various celestial coordinates and references, as well as earth, and the navigational spherical triangle of a vehicle with respect thereto.

FIGURE 10 is a diagram of the navigational coordinates constituting the true heading of a vehicle.

FIGURE 11 is a perspective schematic illustration of the celestial data analog mechanism of the celestial data computer as used in the invention system.

FIGURE 12 is a side elevational view of an exemplary data computer bail and support assembly, partly in cross-section.

FIGURE 13 is a side elevational view of the rack assembly for the assembly of FIGURE 12.

FIGURE 14 is a cross-sectional view through the rack of FIGURE 13 along the line 14—14 thereof.

FIGURE 15 is a plan view of the rack swivel star arm securement portion, as viewed at line 15—15 of FIGURE 13.

FIGURE 20 is a cross-sectional view through a portion of the computer head of FIGURE 19 as taken along the line 20—20 thereof.

FIGURE 21 is a side view of the bail roller support as seen along the line 21—21 in the direction of the arrows in FIGURE 20.

FIGURE 22 is a diagrammatic representation of the axial ray shift with star altitude for a conventional sextant prism.

FIGURE 23 is a representation corresponding to FIGURE 22 for a novel prism arrangement in the invention sextant system.

FIGURE 24A is a partial plan view of the raster disc of the optical system.

FIGURE 24 and FIGURE 25 are schematic circuit diagrams of a novel photoamplifier system for the star and sun tracking modes.

FIGURES 26 and 27 are respective plan and cross-sectional views through a novel sun filter arrangement in the invention system.

FIGURE 28 is a graphical plot of an illustrative example of self-correction in position with the invention automatic astrocompass.

Figure 19:
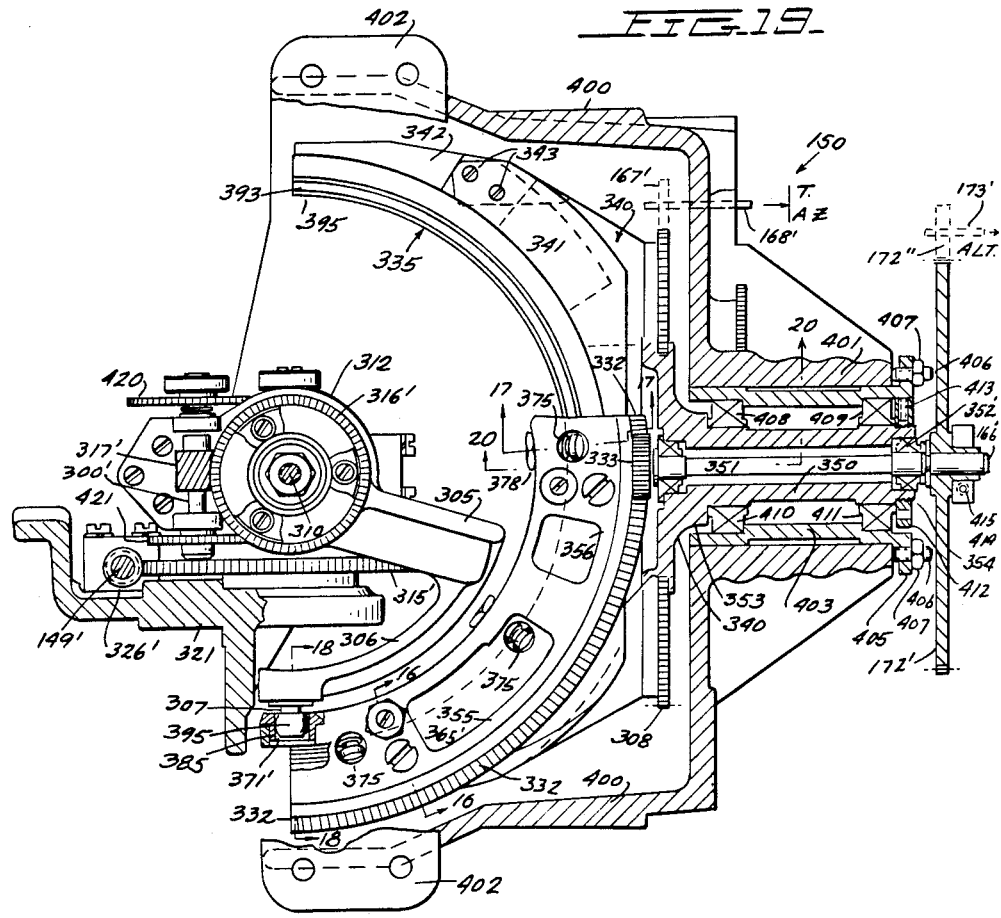
FIGURE 19 is an elevation view, partly in section, of the celestial data computer head assembly.

FIGURE 1 is a schematic block diagram of the overall automatic astrocompass system of the present invention. The automatic celestial tracker 20 is supported in a frame portion 21 of the aircraft preferably near the aircraft skin in order that transparent dome 22 may readily project from the aircraft. The tracking automatic sextant is within celestial tracker 20, as will be set forth hereinafter, and comprises a prism 23 which centers in astrodome 22 for sighting a desired celestial body such as star 24.

The celestial tracker 20 at exposed dome 22 is preferably mounted in a position on the aircraft body wherein prism 23 will have an unobstructed view of as much of the celestial hemisphere as practicable with minimum obstruction from appurtenances on the aircraft. The celestial tracker 20 and its associated equipment including prism 23 and dome 22 are remote from the pilot or navigator of the aircraft, as it is part of an electrically and servo-operated system which need not be in the cockpit. As will be set forth hereinafter, most of the significant sections of the invention automatic astrocompass system may be remote from the cockpit, with only the indicators and the remote controls therefor at the pilot's position.

A vertical gyroscope 25 is secured to an aircraft frame portion 21′ corresponding to frame 21 of the tracker 20 and is related to tracker 20 for establishing a horizontally stabilized platform therefor as will be set forth in more detail in connection with FIGURES 5 and 6 hereinafter. The platform within tracker 20 is stabilized by roll and pitch signal connections as indicated at 26 and 27, respectively. The vertical gyro 25 has an erection amplifier 28.

As described generally hereinafter in connection with FIGURE 6, and in more detail in the copending application Serial No. 560,743 referred to above, the output signals of celestial tracker 20 constitute the celestial body altitude reading at lead 20 and the relative bearing signal at lead 21. The output leads 30 and 31 are impressed upon computer 32 of the astrocompass system hereof. The operation of the celestial tracker includes a photosensitive amplifier which provides a celestial photoelectrical signal output to lead 33 for celestial detector and control unit 34. The celestial detector and control unit 34 activates the elevation and azimuth servos of celestial tracker 20 through respective leads 35 and 36 in a manner described in the aforesaid patent application. The celestial tracker 20 is maintained at proper elevation and azimuth, in continuous tracking relationship with an acquired selected celestial body 24 such as a star, and continuously and automatically provides accurate altitude indications of the star position to output lead 30 and relative bearing indications of the direction of the aircraft through output lead 31.

In order to obtain the true heading direction of the aircraft, it is, of course, necessary to translate its relative bearing with respect to true azimuth or some other known position such as due north. The computer system 32 schematically indicates the correlation of relative bearing signal 31 from tracker 20 with other manually preset data inputs at position 37 and in conjunction with schematically indicated celestial data computer 40. The determination of true heading of a vehicle from a celestial observation utilizes knowledge of the approximate geographical position of the vehicle together with the direction of a true vertical as provided by the horizontal gyro-stabilized platform and time. The quality of the known data naturally influences the degree of precision which can be realized in the determination of true heading.

The present invention has been constructed and thoroughly field tested. Such tests, together with theoretical analysis, has established true heading readings with an accuracy of better than $\frac{1}{10}$ of 1°, with the quality of input information to the computer not having to be unusually precise. For a particular geographical position and time, the relative orientation of any celestial body can be computed. Such orientation is defined by the terms: true azimuth, and the altitude of the celestial body. The celestial body data computer 40 is provided to continuously afford the true azimuth and altitude of the celestial body once the manual input data 37 is preset into the computer as will be described in detail hereinafter.

The computed altitude is utilized to initially orient the automatic tracker 20 to the selected celestial body 24. The measurement of observed altitude is not utilized in determining true heading. The observed altitude is utilized for line of position, and in celestial fix determinations, as set forth above.

As shown at 37 in FIGURE 1, the computer 32 has manually inserted or preset input data of the (approximate) geographical position of the vehicle namely: latitude by lead 41, longitude by lead 42, and the approximate true heading by lead 43. The later reading is known as best available true heading or B.A.T.H. The celestial coordinates of the sun or selected star are manually impressed upon computer 32: at lead 44 for the sidereal hour angle of the body, at lead 46 for its declination, and at lead 45 for the setting of the Greenwich hour angle of Aries.

The Greenwich hour angle setting is made an initial setting in computer 32, which has a frequency standard and timing means to carry on the time relationships after such initial setting. The manual data inputs at 37 may be performed by remote control through a control panel as described in connection with FIGURE 8 hereinafter. The civil time or clock indicator 47 of local time is preset by rheostat 48. Knob 49 is set to either solar or sidereal time rate, to which system 32 is alternately adjustable. A separate time standard and drive unit 50 is connected by lead 51 to provide accurate timing signals for the clockwork mechanism in computer 32 as will be shown in more detail in connection with FIGURE 8 hereof.

The basic signal output of celestial data computer 40 is the selected star's azimuth and altitude. Precise measurement of celestial body altitude is provided by the celestial tracker 20 as hereinabove stated; the computed altitude from computer 40 serving to initially orient the tracker. The computed true azimuth of the selected celestial body by computer 40 is suitably combined in the invention system with an accurate relative bearing signal of the aircraft with respect to the body as derived by celestial tracker 20 and passed to computer 32 through lead 31, to produce a continuous and precise true heading indication at indicator 51. The celestial altitude is fed to indicator 52 in computer 32. The true heading is readily remotely transmitted as a servo signal by lead 53 from computer 32. The computer servo control unit 54 is interconnected with computer 32 by lead 55 to derive the automatic functioning of the astrocompass system in a manner to be set forth hereinafter.

FIGURES 2 and 3 are respective side and end elevational views of an exemplary photoelectric celestial tracker 20, together with the vertical gyroscope 25, corresponding to the units illustrated in schematic FIGURE 1. The exemplary tracker and gyro combination 20, 25 is rigidly mounted upon a platform or frame 21a which corresponds to the structure 21, 21' of FIGURE 1. The mounting plate 21a may constitute a suitable section of the air frame of the aircraft or constitute an intermediate platform which in turn is suitably mounted to the aircraft. The platform or frame 21a is mounted substantially horizontally with respect to the aircraft. The tracker 20 is supported on frame 21a through mounting bolts 60, 60. The tracker mechanism is contained with housing 61, 62 joined across a sealed area 63. Astrodome 22 is mounted on upper frame 61.

The upper frame 61 has a series of hermetically sealed connectors 64 projecting from one side for electrically interconnecting the components 64 projecting from one side for electrically interconnecting the components within tracker 20 to the external circuitry. The vertical gyroscope 25 is housed within enclosure 65 which in turn is bolted at 66, 66 to frame 21a. The units, 20, 25 are preferably sealed against atmospheric conditions, pressure changes, etc. in order to maintain the proper functioning of the assembly. The assembly 20, 25 is mounted with astrodome 22 protruding from the top of the aircraft's fuselage to permit sighting by the photoelectric scanner of a large portion of the sky hemisphere.

FIGURE 4 is a perspective illustration of an exemplary photoelectric sextant used in the celestial tracker 20. The photoelectric sextant 70 comprises a tracking prism 71 corresponding to that indicated schematically at 23 in FIGURE 1. The optical and mechanical components associated with prism 71 are mounted within a cylindrical housing 72 which in turn is mounted within outer cylindrical housing 73. A stray light shield 74 is pivotally supported across prism 71. Pivots 75, 75 are for mounting a corrector lens when used with the sextant 70. The components within and associated with the photoelectric sextant 70 of FIGURE 4 are detailed in FIGURE 6 and more fully described hereinafter.

The photoelectric sextant 70 is arranged to rotate in azimuth about the rotatably supported cylinder 73, which in turn carries the servo mechanism for controlling mechanical movements within the sextant 70. Synchro motor 76 controls the shutter phase change; elevation drive motor generator 77 controls the altitude tracking or elevation of prism 71 in conjunction with a photoelectric control signal hereinafter described in connection with FIGURE 6; synchro unit 78 is the elevation synchro unit geared at 25 times the speed of a two-speed signal transmission servo. Motor 79 is the synchronous motor which operates the shutter within sextant 70. Housing 80 is for the photoelectric tube of the celestial tracker circuit mounted dependently from housing 73.

The photoelectric sextant assembly 70 is rotatable in azimuth in accordance with the photoelectric tracking and the azimuth servo signals applied by lead 36 to the azimuth drive motor generator 81. Suitable two-speed azimuth position synchro transmissions with single and 25 times speed are also within the sextant assembly but not seen in FIGURE 4. Terminal boards such as 82 are employed in sextant 70 for interconnecting the various leads of the motors, synchros, and other electrical components of the sextant, as will be understood by those skilled in the art. The azimuth drive motor generator 81 is suitably geared to pinion 83, a portion of which is seen to project through opening 84 of housing 73. Pinion 83 engages with an internal ring gear within the platform assembly of FIGURE 5 and is schematically indicated in FIGURE 6. Servo operation of azimuth control motor generator 81 by celestial detector control unit 34 serves to rotate sextant assembly 70 in azimuth over a 360° swing within its support.

FIGURE 5 is a perspective illustration of the gyro stabilized horizontal platform assembly 100 together with photoelectric sextant 70 supported therein. The gyro stabilized platform 100 comprises a cylindrical member 85 rotatably supporting housing 73 of sextant 70. The tracking prism 71 of sextant 70 projects centrally above the platform assembly. The horizontal rectangular frame 86 is the gimbal support. The platform further comprises outer gimbal (roll) 87 and inner gimbal (pitch) 88. The inner gimbal drive 90 comprises an assembly of motor generator 91 mounted on the frame together with the two-speed synchro units 92, 93 further described in connection with FIGURE 6. The terminal interconnection board 94 is for inner gimbal drive 90 electrical components.

The outer gimbal drive 95 includes the roll motor generator 96 and suitable synchro units indicated at 97, together with terminal board 98 for the assembly. Outer gimbal drive gear box 99 is associated with motor 96 and synchro 97. The cylindrical mounting flange 85 for sextant 70 permits the sextant to rotate over a 360° orientation with respect to the platform assembly 100. The mounting cylinder 85 contains an internal 360° gear (see FIGURE 6) which pinion 83 of sextant 70 engages for azimuthal orientation of sextant 70 in accordance with the photoelectric signals as will be set forth.

The horizontally stabilized platform assembly 100 contains suitable roll rails and pitch rails which in coaction with the roll and pitch gimbal drives are synchronized with the roll and pitch signals from the vertical gyro 25 to accurately and precisely stabilize the platform assembly 100 for true vertical orientation of the sextant assembly 70. It is important to obtain an accurate vertical reference for sextant 70 in order that its celestial altitude and relative bearing signals be precise. The assembly 100 in conjunction with gyroscope 25 and associated amplifiers (see FIGURE 6) has been constructed to care for deviations in the roll and pitch axes of at least +15°. Specific arrangements for horizontally stabilizing the platform for the mounting 85 in which sextant 70 is rotatably held will be understood by those skilled in the gyro art, and the various components of platform assembly 100 are shown for illustrative purposes.

An important contribution of the platform assembly 100 is to maintain a vertical orientation of the photoelectric sextant assembly 70 despite changes in the roll and pitch axes due to vibration, off-level flight, motion, or other factors in the travel of the aircraft. Maintenance of the vertical reference accurately by the herein described means affords precise true relative bearing and altitude indications for the overall automatic astrocompass system without requiring multiple readings or averaging-out of successive readings as required in manual or semi-automatically operated sextants or astrocompass systems of the prior art.

FIGURE 6 is a schematic diagram of the essential components and their correlation in the celestial tracker 20 and horizontally stabilized platform 100. Celestial tracker 20 comprises the photoelectric sextant 70 supported within gyro stabilized horizontal platform 100 in the manner described in connection with FIGURES 4 and 5. The tracker housing 62 (see FIGURE 2) is fixedly mounted with respect to the aircraft fuselage 21 with astrodome 22 protruding from the aircraft. The dome 22 is made of tough transparent plastic material to protect the interior of the sextant.

The prism 71, such as of flint glass, is mounted centrally in hemispheric dome 22 for altitude and azimuth movements in accordance with its associated controls. Light from the distant celestial body, in the form of beam 101, impinges upon prism 71 and emerges therefrom as beam 102 vertically downwardly through cylindrical housing 73 of sextant 70. A moving corrector lens 105 is placed between the dome 22 and tracking prism 71 to negate the optical power of dome 22 and provide parallel rays at 101' that enter prism 71. Thus, the telescopic optics which follow through the prism and sextant 70 are focused for an object at infinity. The corrector lens 105 is arranged to collimate the light from beam 101 which is otherwise uncollimated by the dome 22.

The vertical beam 102 corresponds to the optical axis of sextant 70 and is actually the relative bearing axis of the system in view of the sextant being held in true vertical orientation by the stabilized platform 100. Vertical beam 102 passes through objective lenses 103, center lens 104 and through the raster carrier modulation wheel 106.

The photoelectric sextant 70 is arranged to automatically track a selected celestial body. The navigator of pilot is relieved of any operational duty in connection with the photoelectric sextant. In fact, as previously described, the celestial tracker 20 is placed in a position in the aircraft remote with respect to the cockpit. The prism 71 is automatically oriented to true star tracking position and maintained in such position independently of the aircraft's gyrations in flight. The resultant angular positions both in azimuth and altitude of the prism 71 are correspondingly measured by the servo units thereof to produce corresponding altitude and relative bearing signal outputs.

Reference is made to the aforesaid copending patent application for further circuit details of a comparable photoelectric tracking system. Also, reference is made to copending patent applications Serial Nos. 321,218 and 321,696 filed Nov. 20, 1952, now Pat. No. 2,905,828, for systems of modulating the light beam with a raster carrier modulation disc (such as 106) and a companion shutter. Details of the raster-shutter operation and the resultant carrier-modulated light beam 108 are fully described in the referred to copending applications. The resultant modulated light beam 108 is impressed upon a photoelectric amplifier tube 110 through right-angle prism 109 and condenser lenses 111.

The photoelectric tube 110 is preferably a photomultiplier tube to provide extremely high sensitivity for the relatively lower intensity of impinging light beam 108'. Details of the circuit relationship of photo-multiplier tube 110 and its associated photoelectric signal amplifier 112 are set forth in copending applications referred to. The carrier modulated photoelectric signals are amplified at 112 and conducted by lead 33 to the celestial detector-control unit 34. Suitable circuits for such detector-control unit 34 are shown in detail in the applications Serial Nos. 321,218 and 321,696 to produce output signals at leads 35 and 36 corresponding to the altitude servocontrol and azimuth servocontrol for the sextant 70.

The altitude servo signal at lead 35 is connected to the motor generator drive 77, which through suitable gearing 115 is coupled by linkage indicated at 116 to rotate prism 71 in the altitude orientation corresponding to the altitude servo signals of unit 34, which in turn are controlled by the position of the celestial body and its beam 101 impinging upon prism 71 in the manner described in the referred to copending patent applications. The tracking position of prism 71 in altitude corresponds to a predetermined rotation of the motor generator 77 and its associated gearing 115. The altitude synchros 78 and 78' are a two-speed synchro interconnection through gearing indicated at 117 to gear unit 115 and are, respectively, at 25 times and unity times the movement of prism 71 to produce a sensitive and accurate altitude output signal for the auxiliary computer at lead 120.

The azimuth servo signal output from control unit 34 at lead 36 is impressed upon the motor generator unit 81 for driving sextant 70 in azimuth. This is accomplished through suitable gearing indicated at 122 connected to pinion 83 in cylinder 73 of sextant 70. The opening 84 in the cylindrical housing 73 (see also FIGURE 4) permits the projecting pinion 83 to engage with internal 360° gear 123 in the support 85' for the sextant. Support 85' in practice is within stabilized platform 100 and associated with the flange or cylinder mounting 85 thereof. The synchro signal transmission for the azimuth position of sextant 70 is derived by suitable gearing connection indicated at 124 to motor generator drive 81 of two-speed synchro units 125, 125'. The output of synchros 125, 125' produces the relative bearing signal conducted to the auxiliary computer lead 121.

The celestial detector and control unit 34 accordingly generates altitude and azimuth tracking servo signals through output leads 35, 36 to suitable activate the motor generator units 77 and 81, respectively, to bring the prism 71 in suitable altitude and azimuthal position to accurately track the celestial body whose beam 101 impinges on prism 71. Such tracking is performed continuously and automatically by the tracker system 20. Since the photoelectric sextant 70 is maintained in a true vertical orientation by the stabilized platform 100, the signals at the output of celestial tracker 20 to the auxiliary computer 141 are precise relative bearing and altitude measurements. The degree of accuracy is of the order of one or two minutes of arc with a properly designed and constructed system.

A sun filter 130 is insertable in beam 102' when the celestial tracker 20 is used to track the sun. Insertion and removal of sun filter 130 is accomplished by solar relay S–1. Similarly, a suitable field stop 131 is insertable in beam 102 and actuated by relay S–2. A suitable electrical pickup unit 132 is coupled to raster disc 106-shutter 107 drive as indicated at 133. A precise signal, dependent upon the rotational speed and phase of the raster-shutter 106, 107, is derived as a reference signal at pickup unit 132 and transmitted by lead 134 to the celestial detector and control unit 34 for use in electrically interpreting the modulated star signals from photoelectric tube 110 in the manner shown and further described in the aforesaid copending patent applications.

The cylindrical housing 73 of photoelectric sextant 70 is supported within the cylindrical flange of mounting 85 of the horizontal platform 100 (see FIGURE 5). Such support permits 360° rotation of the sextant cylinder 73, which orientation is controlled by the azimuth drive pinion 83 with respect to internal gear 123 within the housing 85 at portion 85' thereof. The gimbal support frame 86 of stabilized platform 100 is firmly secured to a suitable section 21'a of the aircraft structure. The sextant mounting cylinder 85 is generally supported within the inner gimbal or pitch support (see FIGURE 5). The inner gimbal drive 90 comprises the motor generator unit 91 and two-speed servo units 92, 93 referred to in connection with FIGURE 5.

The pitch signal output 27 from vertical gyro unit 25 is connected through pitch amplifier 135 to operate the motor generator 91 and maintain the pitch gimbal in suitable orientation reference with the pitch axis of the vertical gyro 25. The servo mechanism 92, 93 and the schematically indicated pitch amplifier and pitch signal circuitry are well known in the art. Similarly, the outer gimbal 87 has outer gimbal drive assembly 95 which is coupled to the motor generator 96, controlled in turn by the roll amplifier 136 energized by roll signals from lead 26 from the roll axis of vertical gyro 25. The two-speed synchro units at 25 times and at unity speeds 97, 97' are integrated in the roll circuitry and coupled through roll gear box 99 with the motor generator 96 and the gimbal 87. The gimbal 87 is coupled to the gimbal support 86 through the roll rails indicated at 137, 137. The erection amplifier 28 maintains the vertical gyro 25 in the usual manner.

The celestial tracker 20 is thus seen to be vertically stabilized to a high degree of accuracy through the horizontally stabilized platform 100 in which photoelectric sextant 70 is mounted, and in turn referenced to the vertical gyro unit 25. In a carefully designed and constructed system, the errors contributed by the vertical gyro to true vertical orientation and in turn to altitude and bearing errors are of the order of only a few minutess of arc. The overall contribution of the celestial tracker signals in conjunction with the signals to be described from the computer 32 and celestial data computer 40 have been found in a well constructed system to provide true heading and altitude readings to an accuracy well within 1/10 of 1° despite pitch and roll tilts to the order of 15° and over a wide range of altitudes of celestial bodies. By using gyro correction networks to compensate for gyro errors due to the airship's rate of speed, the earth's rate and Coriolis acceleration can further reduce signal errors due to the use of a vertical gyroscope. The use of a two-speed synchro system in the servo mechanism serves to minimize errors inherent in the gyro stabilization and signal transmission.

FIGURE 7 is a schematic representation of the overall computer 140 and its associated auxiliary computer 141. Computer units 140 and 141 are preferably hermetically sealed and designed for remote location aboard the aircraft. They are interconnected with the respective indicator panels and control signal lines and other components of the automatic astrocompass. The exemplary computer units 140, 141 correspond to portions of computer 32 described in connection with FIGURE 1. The manually set input data is performed with the section of the system described in connection with FIGURE 8, resulting in input signals for computer 40 as follows: The integrated local hour angle L.H.A. at lead 142; the latitude at lead 143; and the declination at lead 144. These three resultant computer input data signals are derived from the manually set and controlled indicator panels A and B, as will be described in connection with FIGURE 8.

The L.H.A. measurement through lead 142 is connected to the two-speed synchro translation servo mechanism 145, 146 (FIGURE 7) which are, respectviely, at unity and 25 times speed of the basic L.H.A. measurement. The servo units 145 and 146 are mechanically intercoupled through gearing schematically indicated at 147 and control the operation of synchro motor generator unit 148 in conventional remote servo mechanism operation. An accurate L.H.A. motivation of input shaft 149 is accomplished through the input L.H.A. signal 142 to celestial data computer 150 through associated input gearing 151.

The celestial data computer schematically indicated at 150 corresponds to unit 40 of computer 32 of FIGURE 1. An exemplary data computer 150 is a five-axis mechanical analog which translates three axes input positions to corresponding output signals at its two output shafts 165, 166, as will be generally set forth herein, and more specifically in connection with the description of FIGURE 11 hereinafter.

The L.H.A. signal input at lead 142 to computer 140 is translated from electrical values to a precise mechanical angular equivalent at input shaft 149 through the interconnected and coupled two-speed servo system 145, 146 and motor generator 148 gearing 151. In a similar manner the latitude signal measurement at lead 143 is translated to an identical angular counterpart at input shaft 152 to data computer 150 through two speed servo system 153, 154 and the interconnection through 155 to motor generator 156 and gearing 157. Also, the declination electrical signal at lead 144 to computer 140 is translated to its angular counterpart at input shaft 158 of data computer 150 through two-speed servo system 160, 161, the mechanical interconnection 162, and motor generator 163 with gearing 164.

It is to be noted that the invention celestial data computer 150 has only three mechanical input axes, namely 149, 152, 158. This is made possible by the novel integration into a single input of L.H.A. at lead 142, combining suitably the separate settings of the G.H.A. of Aries, the S.H.A. of the selected celestial body, and civil or local time. Such integration into one axis at 149 for data computer 150 is further detailed in connection with the description of indicator panel A of FIGURE 8 hereinafter. Such single axis integration at L.H.A. input simplifies the construction and operation of celestial data computer 150, as will now be understood by those skilled in the art.

With the aforesaid signal inputs at 142, 143 and 144, the celestial data computer 150 has exact angular counterparts provided at its mechanical input axes 149, 152 and 158. The mechanical analog computer 150 thereupon is constructed to produce continuous true azimuth angular output at its shaft 165 and corresponding computer altitude at shaft 166 for the selected and tracked celestial body. The celestial data computer 150 is arranged to automatically translate the three input readings into a continuous and accurate output reading of the celestial body position of azimuth and altitude. In view of the continuous time signals and control of the L.H.A. input at 142, the celestial data computer 150 is arranged to provide accurate changing continuous readings of the true azimuth and computer altitude of the celestial body at its output shafts 165, 166.

These continuing precise computed references of the celestial body are combined, through auxiliary computer 141, with the corresponding continuous tracked information from celestial tracker 20, namely, the relative bearing and celestial body altitude readings to in turn provide precise true heading and other desired and necessary navigational information to the remote pilot and/or navigator stations, as will be further detailed. Towards this end, the output true azimuth angular indications of shaft 165 are translated into corresponding accurate angular servo signals at lead 170 through mechanical interconnection by gearing 167 and 168 to two-speed synchro signal generators 169, 169. The indications in the schematic FIGURES 7 and 8 of "1×" and "25×" designate the unitary speed and 25 times speed construction of the corresponding servo units. The mechanical and electrical interconnection at the servo mechanisms are indicated as understood in the art and are not detailed herein for purposes of clarity. Similarly, the angular outputs of computed altitude shaft 166 are translated into corresponding precise electrical signals at output lead 171 through gearing 172, 173 and the two-speed servo generators 174, 174.

The true azimuth and computed altitude output leads 170, 171 are connected into the auxiliary computer 141 for further integration with the tracker 20 signals and the servo mechanisms now to be described. The computed altitude signals from computer 150 are impressed by lead 171 to the two-speed differential generator units 175, 176. The celestial body altitude signals as derived by tracker 20 (see FIGURE 6) are also impressed by lead 120 to the two-speed synchro units 175, 176. The altitude output for the system is specifically the tracked altitude as appears in lead 120, in view of the precise nature of celestial tracker 20 and its gyro-stabilized horizontal platform with vertical gyro 25. The altitude reading, corresponding to the signal in the lead 120 is repeated to remote indicator panels for the pilot and navigator, through lead 177, connecting to a servo repeater and altitude indicator in panel C (see FIGURE 8).

The computed altitude measurement 171 from computer 150 is, however, important in directing the tracker 20 to specific acquisition of a desired celestial body. Towards this end the computed altitude 171 is connected to the two-speed differential generators 175, 176 which in turn are mechanically interconnected through gearing connections 178 to motor generator 180 and ten-speed signal generator 181. Motor generator 180 and synchro generator 181 are electrically interconnected by leads 182 and with altitude correction amplifier schematically shown at 183 by lead 184.

The true heading indications to the remote pilot position are derived by suitable integration of the true azimuth readings of lead 170 as transmitted from the celestial data computer 150, together with the relative bearing readings as transmitted by lead 121 from the celestial tracker 20. The true azimuth readings are continuously fed by lead 170 to the two-speed differential generators 185, 186. The relative bearing signals are continuously fed by lead 121 to the two-speed system 185, 186 at electrical inputs 187 thereof. The two-speed units 185, 186 are mechanically interconnected at 188 and with gearing 189 to the output 190 of differential gear 191. The differential gear input 192 is connected mechanically to unit 193 indicated schematically from an input 194 which represents the manual best available true heading (B.A.T.H.). The B.A.T.H. signal is preset. Integration of the B.A.T.H. readings, suitably geared through a differential 191 to gearing 188 of the two-speed differential synchros 185, 186, together with the electrical integration of the true azimuth signal input at lead 170 and the tracker relative bearings inputs at 121 produce the resultant true heading (T.H.) outputs 53, 53' and 53a.

The remote T.H. readings are derived by synchronous generators or servos in the conventional manner. The T.H. signal at lead 53 is derived from the two-speed synchro generators 195; that for lead 53' by the single speed synchronous generator or servo 196; and that for lead 53a by single speed generator 197. The auxiliary computer 141 may be used for magnetic compass reference. Towards this end, a "heading correction" gearing connection 198 is derived from the differential gear 191 and impressed upon the "magnetic variation" unit 199 which translates the mechanical resultant to a remote electrical signal at lead 200.

The true azimuth reading as derived from the computer 150 output is connected by true azimuth signal lead 170 to the output lead 201 of auxiliary computer 141 for indicator panel C remotely located. The true heading (T.H.) signal lead 53a is also connected to remote indicator panel C. The T.H. signal leads 53, 53' are used for connection to other remotely located external equipment for navigational or other purposes. Other features may be incorporated in the auxiliary computer, such as connection of the signals therein for remote control of a "desired track" reading with respect to actual true heading; for altitude and relative bearing "search control" of the celestial tracker, and for other auxiliary or specific purposes, as is understood by those skilled in the art.

FIGURE 8 diagrammatically illustrates the exemplary indicator panels arrangement. Indicator panel A contains the means for setting and the indicators of time, G.H.A. of Aries, and S.H.A. of the star or other desired celestial body. The time reference or "frequency standard" signals are presented to panel A by lead 51 from the "time standard and drive" unit 50 (see FIGURE 1). Lead 51 energizes clock motor 202 which is connectible through clutch 203 and mechanical connections and gearing 204 to clock 205 indicating civil time. Clock 205 is set for a desired time reference through clock set motor 206 energized by lead 207 entering panel A from set control panel 210 to be described.

The time reference or clock motor 202 is connected to differential gear 207 through respective neutral clutches 208 or 209. Clutch 208 engaged establishes the rate corresponding to sidereal time. When neutral clutch 209 is engaged, it establishes solar time rate for the system. A suitable external switch (not shown) engages clutch 208 or 209 for this purpose. The output drive 211 of differential gearing 207 is connected to G.H.A. of Aries indicator 212 and to the input of second differential gear 213. A motor 214 is coupled through differential gear 207 for setting indicator 212 to the G.H.A. of Aries. The G.H.A. of Aries is measured westward from the Greenwich meridian to the vernal equinox as described hereinafter in connection with FIGURE 9. The G.H.A. of Aries set motor 214 is controlled by input lead 215 from set-control panel 210 to be described.

Due to the connection of indicator 212 to continuous clock movement 202 at the proper rate through clutch 208 or 209 and the indicated mechanical gearing elements, the G.H.A. of Aries is continuously and correctly indicated at 212 once it is manually set through control panel 210 at a given time reference. In a similar manner, the S.H.A. of the star is manually set through control 210 and lead 216. Lead 216 controls the S.H.A. set-motor 217 which is mechanically coupled through gearing 218 to the S.H.A. of the star indicator 220. Set motor 217 and indicator 220 are also coupled to differential gear 213. The output 221 of differential gear 213 is the result of the respective inputs of differential gear 207 at output 211, integrating the G.H.A. of Aries and the time drive. The sidereal hour angle of the celestial body is maintained and indicated at 220 through the output connection 128 from differential gear 213.

An important feature of the present invention is the presentation of the local hour angle or L.H.A. as a direct axis (149) input to the celestial data computer 150. The L.H.A. electrical signal to lead 142 is derived through two-speed differential synchro generator arrangement 222, 223. The generators 222, 223 are coupled through mechanical arrangement 224 to the output 221 of differential gear 213. The differential synchro generators 222, 223 are suitably connected with the longitude signal input through lead 225. The output 142 of the two-speed differential synchro system 222, 223 at lead 226 constitutes the electrical net signal for the L.H.A. transmission by lead 142 to the two-speed transducers 145, 416 at the input shaft 149 of computer 150. The longitude is manually preset at indicator panel B, as will be described.

Indicator panel B has provision for manually setting and indicating the longitude and latitude positions of the aircraft with respect to earth (see FIGURE 9) and the setting of the declination of the selected celestial body. It is to be noted that the indicator panels A, B and C of FIGURE 8 are preferably hermetically sealed for all-weather operation. It is to be further noted that the arrangement of the particular settings and indicators on the respective panels may be interchanged or additional ones added if desired. For example, an indicator for "magnetic variation" may be employed; one for "altitude intercept"; as well as a "desired track" indicator may be used in conjunction with the other indicators and may be manually or remotely set on panels A, B, C.

The longitude of position reading is manually set through control panel 210 and lead 227 therefrom to longitude set-motor 228. Set-motor 228 is coupled to longitude indicator 230 by mechanical connection 231. The two-speed synchro generator system 232, 233 is interconnected by gearing 234 with set-motor 228 and indicator 230. The two-speed synchronous generators produce an electrical signal corresponding to the angular reading of longitude in lead 225, which lead connects to the A panel for the purpose heretofore described.

The latitude of position is manually set through control panel 210 through lead 235 impressed upon set-motor 236. Set-motor 236 is coupled by connection 237 to latitude indicator 240. The two-speed synchro generator system 241, 242 is intercoupled by schematically indicated means 243 which in turn is connected by gearing 237 to motor 236. The electrical output of the generator system 241, 242 constitutes the latitude servo signal of lead 143. Lead 143 conducts latitude to the servo translator system 153, 154, 156 of the computer 140 (see FIGURE 7). This provides a corresponding angular latitude setting at input axis 152 of the celestial data computer 150.

The declination is manually set into the system through control panel 210 and lead 245 therefrom to panel B. The lead 245 controls the set-motor 246 for the declination control. The gearing 247 connects to declination indicator 250 a two-speed servo generator system 251, 252 which translates the mechanical indication of declination indicator 250 as set by motor 246 through the mechanical coupling arrangement schematically indicated at 248. The generators 251, 252 are suitably interconnected by lead 253, and their output to lead 144 constitutes the electrical servo signal of the declination 250. Lead 144 as previously described connects directly to the servo translators 160, 161 and 163 of computer 140 to set the input axis 158 of data computer 150 to the declination setting.

The indicator panel C indicates the readings from the output of auxiliary computer 141 (see FIGURE 7). The leads 53a, 201, 177 constitute the input to indicator panel C. The true heading indicator lead 53a is impressed upon a servo transducer 254 coupled to the true heading indicator 255 and the servo motor generator 256, through the gearing mechanical connections 257, 258.

The true azimuth connection 201 is made to the servo transducer 259 which is coupled to the true azimuth indicator 260 and the companion synchro motor generator unit 261 by suitable gearing 262, 263. Similarly, the altitude reading derived from the auxiliary computer 141 through lead 177 connects to the servo motor 264 to control the indication of the altitude indicator 265.

The set control panel 210 is diagrammatically indicated for controlling the six manual inputs to indicator panels A, B. The set control panel 210 comprises a control lever 266. Lever 266 is manually arranged to electrically engage selectively the respective contacts: contact 267 for the control of longitude set motor 228 and lead 227; contact 268 for the latitude set motor 236 through lead 235; contact 269 for the clock set motor 206 through lead 207 for the time setting at 205; the G.H.A. of Aries contact 270 for controlling the indicator setting at 212 through the set motor 214 through lead 215; the G.H.A. of the celestial body or star contact 271 for the control of its corresponding set motor 217 through lead 126; and the declination contact 272, with control at declination indicator 250 through its corresponding set motor 246 and lead 245.

When lever 266 is engaged with any one of the contacts 267–272, the operation of the corresponding set motor is performed through control knob 273 which controls the direction and rate of the connected set motor through a rheostat (not shown). The set motors are preferably reversible direct current motors operated through a fixed motor voltage and a variable rheostat through control knob 273 in series with respective contacts 267–272 in a manner which though schematically indicated herein for clarity purposes is understood by those skilled in the art. The exemplary indicator control panel arrangement of FIGURE 8 permits remote control of the settings through a remote control panel 210, as well as the use of computer units 140, 141 remote from panels A, B, and C. However, these may be variously arranged as desired. The indicator readings may be initially set by direct manual settings, eliminating the need for control panel 210 and the corresponding set motors for indicators 205, 212, 220, 230, 240 and 250. The synchronous generators associated with respective indicator mechanism serve to translate their respective indications from mechanical to electrical signals for remote actuation of the three input axes of the celestial data computer 150.

The arrangement herein permits small hermetically sealed compact read-in and read-out units, such as indicator panels A, B and C and set control panel 210, to be placed near the pilot's and navigator's positions in the aircraft, with the computer units 140, 141 including celestial data computer 150 and celestial tracker 20 and the associated vertical gyro 25, amplifiers and power supplies to be remotely located from the cockpit at accessible storage and maintenance locations. Also, the use of the servomechanisms hereof permit multiple or duplication of any of the readings, indications and composite values to the transmitted different stations and positions in the aircraft and feeding to other navigational instruments.

*Celestial navigation*

The automatic astrocompass of the present invention permits rapid and automatic derivation of navigational data, dependent solely upon sighted and tracked celestial bodies such as the sun in daylight and the stars and planets at right. The celestial navigation permits the pilot to obtain a reliable and precise means of fixing the aircraft's position without recourse to radio direction finding or radar contact with the ground. It does not require the use of magnetic compasses which are subject to serious deviation errors in polar regions. Further, the astrocompass data serves as a check or reference on the other direction finding equipment which the aircraft may carry. It is usable for checking the accuracies of magnetic compass headings and gyroscope precession. It is well established that an astrocompass is the absolute means of fixing an aircraft's position. The invention system provides direct, rapid, reliable, precise and automatic observations of a selected celestial body and minimizes the duties of navigation aboard an aircraft.

FIGURE 9 is a representation of the celestial sphere, with the earth represented in the center of the celestial sphere. In a clestial sphere, the sun, planets and the stars are visualized as projected to the inner surfaces of such a sphere with an infinitely large radius. In actuality, the diameter of the earth is so small as compared to that of the infinitely large celestial sphere that at any point on the earth, or in the air of an aircraft, one may consider to be the center of the celestial sphere 275. The diagrammatic representation 275 of the celestial sphere and the earth sphere 276 are, of course, not to scale as just referred to but are excellent for visualization of celestial navigational problems and solutions. In the representation of FIGURE 9, the earth and the celestial sphere are of similar geometric shape, and every point on the earth or in altitude above it of an aircraft can readily be projected to a similar point on the celestial sphere. The north-south polar axis of the earth is projected onto the celestial sphere to form the elevated pole $P_n$ shown in FIGURE 9, and the corresponding southern pole $P_s$ is not seen.

The stars on the celestial sphere always maintain the same position relative to one another on the celestial sphere. However, the subpoint of any celestial body as projected upon the earth changes at a constant rate due to the earth's rotation. Thus, the stars appear to move across the sky from east to west due to the earth's rotation from west to east each 24 hours. The zenith is the point on the celestial sphere (Z) vertically above the observer in an aircraft or standing on earth. Further details as to the celestial sphere and its relation to navigation and terminology, may be obtained from standard references well known in the art. The chart in connection with FIGURE 9 defines the symbols used for purposes of solving the basic navigational spherical triangle to determine the celestial coordinates of the selected body, and in turn the true heading and altitude readings referred to above.

The celestial body is indicated in FIGURE 9 at M. The celestial triangle solved by mechanical analog computer 150 constitutes the triangle on celestial sphere 275: $P_n$—Z—M. Details of mechanical computer 150 with relation to the re-creation in miniature of such spherical triangle will be set forth in more detail in connection with FIGURES 11 to 21. Reference is made to copending patent application Serial No. 300,482 assigned to the same assignee as the present case for further aspects of the celestial sphere problem as utilized in a manually operable astro-compass and which has a mechanical analog computer incorporated therein. FIGURE 10 is a geometric planar representation of the derivation of true heading (TH) as the angular difference between the true azimuth ($Z_n$) of the celestial body (solved for in the data computer 150), the minus the angle of the relative bearing (R.B.) of the celestial body (solved for by celestial tracker 20). Such integration is the result of subtraction ($Z_n-RB$) and is accomplished in the auxiliary computer 141 described hereinabove in connection with FIGURE 8.

The zenith reference Z, which is the zenith of the observer in the celestial sphere 275, is derived by the vertical gyro system 25 as translated to horizontally stabilized platform 100 for celestial tracker sextant 70, as described hereinabove in connection with FIGURE 6. Also, as described above, the celestial tracker 20 determines the relative bearing (R.B.) between the level-line longitudinal axis of the aircraft in its flight direction with respect to the sighted and tracked star M (sun or planet). The true azimuth $Z_n$ of the celestial body is computed by celestial data computer 150 in a manner to be described and is based on six manual input settings into indicator panels A and B as described in connection with FIGURE 8. The derived true heading (TH) is a precise unambiguous reading at true heading indicator 255, as well as at remote locations due to leads 50, 53 and 53'.

The computer 150 derives a computer altitude measure at lead 171 for integration with the auxiliary computer altitude input 120 from tracker 20. The computed altitude at 171 is used mainly for assisting in the acquisition of the star, while the altitude transmitted to indicator 265 on panel C is basically the more precise version of the celestial body altitude as derived from tracker 20. The search and acquisition of the desired celestial body is conveniently assisted by the output of the celestial data computer 150 as will now be understood.

The invention system and arrangement permits the preselection of celestial bodies and may be used for automatic operation with different stars, where indicated. This feature materially enhances the use of the invention astrocompass in establishing celestial fixed and lines-of-position during navigation of the aircraft. The computer is mechanized to preserve a fixed zenith. Its derived true azimuth and altitude data on a selected celestial body are dependent upon the presettings by the manual controls at panels A and B, including geographical position of the observer and time. A detailed description of the operation of the mechanical analog data computer 150 follows:

Celestial data computer

FIGURE 11 is a schematic diagram of the five axis mechanical analog celestial data computer 150 of the present invention. The general arrangement utilized in computer 150 is generally set forth in the aforesaid copending patent application Serial No. 300,482. Reference is made to diagrammatic FIGURE 7 hereof for the setting of the celestial data computer 150 within the computer section 140 of the invention astrocompass.

The three angular shaft data are fed into the three input shafts of the data computer 150 mainly: L.H.A. shaft 140; latitude shaft 152; and declination shaft 158. As shown in FIGURE 7, the declination shaft 158 is angularly set by gearing 164 operated by servo mechanism from the remote declination setting at indicator panel B (FIGURE 8). The latitude input to data computer shaft 152 is derived through gearing 157 operated by the associated servomechanism with the latitude setting at the indicator panel B. The third input, namely that of L.H.A. to computer shaft 149, is accomplished through gearing 151 from the L.H.A. servomechanism as integrated between indicator panels A and B. The data computer outputs are: the true azimuth gearing 167 which is secured to the T.A. bail brackets 165, the equivalent of an output shaft for the gearing 167. The altitude output of the celestial computer is accomplished through gearing 172 secured to altitude shaft 166.

The celestial data computer 150 is arranged to represent the celestial sphere at any given moment, as used from a given geographical position, and representing a selected celestial body such as a star. FIGURES 12 to 21 illustrate an exemplary computer constructed to perform functions, operations, and produce the results as heretofore set forth for data computer 150 and corresponds to the structural arrangement shown schematically in FIGURE 11.

The data computer 150 is a mechanical analog which has four axes which intersect at a common point indicated at X. The components of computer 150, as will be set forth, represent specific celestial sphere equivalents. A comparison with FIGURE 9 clarifies the mechanical functioning of the computer 150. The vertical computer shaft 300 corresponds to the polar axis indicated at dotted line P. The vertically arranged polar axis 300 intersects at the common point X. The polar shaft 300 is angularly rotated to a position corresponding to the declination of the selected star (sun or planet) through the declination measurement input at gearing 164 to input shaft 158. This is accomplished through the gear sets 301 and 303 with an intermediate shaft 302.

A U-shaped rotatable head 305 is motivated by the declination 164 setting. Rotatable head 305 has an extension 306 which has a direction arm or star arm 307 extending therefrom. The star arm 307 represents the direction to the star body M in FIGURE 9. The radial extension or axis of the star arm 307 is arranged to intersect at the common point X of computer 150. The point X in the mechanical system 150 corresponds to the point AP of the celestial representation of FIGURE 9 representing the assumed position of the observer on earth with respect to the celestial sphere. The star arm 307 direction would correspond to that between AP and M to the star in FIGURE 9. Plate or gear 308 rotates about a center which corresponds to the zenith point Z on an axis corresponding to shaft 166 which when extended would intersect common point X in the computer.

Reference to the celestial diagram FIGURE 9 shows that the assumed position AP corresponding to the point X in the computer would contain the intersection of the three lines to the spherical celestial triangle apices ZPM. The celestial data computer 150 resolves the angular relationships of the aforesaid axes to the cardinal point of the celestial triangle for the selected star body M in a manner to be set forth. The rotating head 305 which carries the star arm 307 is angularly set in accordance with the declination resultant input through shaft 310 rotatably mounted in stanchions 311, 312 on circular plate or gear 315. Gear 350 with stanchions 311, 312 correspond to the L.H.A. position. The ends of shaft 130 are secured to the open ends of U-shaped rotatable head 305.

A beveled gear 316 is fastened to shaft 310 and engages with beveled gear 317 secured to polar shaft 300. The star arm 307 is correspondingly motivated about the axis represented by shaft 310 in accordance with the setting of the declination input at 164 through the gearing 301, 303 to shaft 300 and the engaging beveled gears 316, 317. The axis of the declination setting shaft 310 also intersects the common point X of the computer 150 as seen in FIGURE 11.

The latitude input 157 motivates the latitude gear 320 which is secured to latitude cradle 321 through the brackets 152', 152', that correspond to a shaft input between gearing 157 and latitude cradle 321. The latitude axis 322 (indicated dotted) is normal to the polar axis P. The rotating head 305 which carries the star arm 307 is supported upon latitude cradle 321 as schematically indicated in FIGURE 11 and as shown in more detail hereinafter. The latitude cradle 321 is rotatable in space through 90° on the latitude axis 322. An axis for rotatable head 305, namely the polar axis P, is in the same plane and normal to the latitude axis 322. The star arm 307 is mounted on rotatable head 305 as set forth about an axis which is in the same plane and normal to the polar axis P. The frame of the computer 150 contains the zenith and the latitude axes which are normal to each other and in the same plane. The latitude setting positions the polar axis P in the plane of present meridian such that the angle between the zenith axis and the polar axis is colatitude.

The L.H.A. input at gearing 151 is the integrated time input for computer 150. The L.H.A. input gear 325 which is part of gearing 151 is secured to shaft 149. A bevel gear 326 meshes with L.H.A. beveled gear 315 to orient the rotatable head 305 angularly about the polar axis P in accordance with the actual L.H.A. The speed for the L.H.A. is continuous in view of the accurate clockwork system and presetting as described in connection with FIGURES 7 and 8. The celestial data computer 150 contains a continuous representation of the celestial sphere with respect to the given geographic position at any instant. The direction of rotation of the L.H.A. gear 315 corresponds to the direction of rotation of the earth upon its axis within the celestial sphere with reference to the position of the observer on the earth and the hemisphere location of the observer, as represented by the computer 150 analog.

The continuously moving L.H.A. gear 315 carries stanchions 311, 312 which in turn support the adjustable rotatable head 305 and accordingly maintains the star arm 307 in its analog pointing to the star body M for the celestial triangle solution by the computer. Declination positions the star arm 307 with respect to the polar axis P, and L.H.A. rotates the star arm about the polar axis with respect to the present meridian, thus reproducing the celestial triangle. A novel bail system is employed to derive the computer true azimuth indication from the resultant composite motion of the star arm 307. The bail system is coupled to the star arm 307 and comprises an arcuate sector or rack 330 and an arcuate bail 335 engaged therewith. FIGURE 11 illustrates such arrangement schematically, and reference is made to FIGURES 12 to 21 for further details of an exemplary arrangement therefor.

The arcuate rack 330 contains a lip or projection 331 within which the projecting end of star arm 307 is rotatably engaged for a swivel action between star arm 307 and the rack 330. The arcuate sector contains a rack gear 332 which activates the altitude pinion 333 in a manner to be set forth hereinafter to derive the angular representation of the computer altitude through output gearing 172 attached to the output computer shaft 166. The arcuate rack 330 is of circular shape as is the arc of bail 335. Their circular proportioning is such as to coact smoothly whereby the arcuate sector 330 rides readily along bail 335. Means are employed for guiding and maintaining such riding relationship of the arcuate sector with respect to the bail, as will be shown in detail hereinafter.

A flange 334 is indicated on bail 330, which flange is part of the altitude output sector 330 to coact and maintain its dependent relation with bail 335. Such relation is to permit a slidable movement of sector 330 along the arcuate bail 335 but no relative movement transversely between bail 335 and arcuate sector 330. The gyrations of the star arm 307 in accordance with the combined motions imparted thereto from the declination gear 316, L.H.A. gear 315 and latitude cradle 321 result in the communication from the star arm 307 to the bail 335 of only the star arm 307 motion about the axis 166 and at the zenith point Z. Its motion produces a rotation of the bail 335 about the point Z. It is noted that the bail 335 is secured to the output gear 308 through the brackets 165', 165' which correspond in effect to the output axis 165 of FIGURE 7. The output gear 308 and bail 335 secured thereto are in turn supported in the computer 150 frame as will be set forth hereinafter.

With the frame as a reference for bail 335, the resultant movement of star arm 307 results in a rotative component impressed upon the true azimuth output gear 308, as will now be realized by those skilled in the art. Such azimuth component motion derived from the analog representation in space of the star arm 307 for a given celestial body with the celestial and geographic data inputs through the computer 150 results in a true azimuth indication at output shaft 168' which, as indicated in FIGURE 7, is communicated by servo means to the auxiliary computer 141. Bail 335 which is mounted on the zenith axis 166 is accordingly positioned by the star arm 307 in celestial azimuth.

The arcuate rack 332 riding on bail 335 and positioned along bail 335 by means of star arm 307 transmits celestial altitude to the coacting altitude pinion 333 at the end of shaft 166 and to the output gearing 172 and output shaft 173'. As seen in FIGURE 7, the two-speed servo generators 174 are connected through output lead 171 to the differential servo generators 175, 176 which transmit the angular position of shaft 173' for final utilization of the altitude computed by unit 150.

While the celestial data computer 150 has been hereinabove illustrated and described in connection with its use in the automatic astrocompass of the invention, it is to be understood that the computer unit 150 per se may be used for other significant purposes. For example, it may be used in a manual system for computer celestial data of selected celestial bodies to avoid tedious computations which navigators are required to do in planning their flights. The computer 150 can be used to establish or verify position information directly while in flight or may be used in precomputation of such data. The celestial data inputs through the computer will result in computed celestial altitude and azimuth outputs. Such use of a computer 150 per se is, for example: a star is selected on or near the observer's meridian when the computer 150 is used manually for flight checks. The computer has the celestial data of such star set into it, together with approximate present position. The computer will then indicate the computer altitude and azimuth of the selected star. By use of a sextant, the observed altitude is obtained. The latitude input to the computer is then changed until the computer altitude indicates the same value as the observed altitude. A second star is then selected whose true azimuth is at approximately 90° or 270°. The above computer operation is then repeated, except that the longitude input is used to match the computer altitude with the observed altitude. These two operations can be performed alternately at time intervals at the discretion of the navigator. The difference between the last two latitude readings and the time interval will give the navigator sufficient information to enable him to compute the new latitude for the next longitude reading. The longitude settings are computed in the same manner for each latitude reading.

The computer 150 per se may also be used for precomputation of log book data. In such case, the latitude and longitude of the desired check point on the course is set into the computer 150. The declination and S.H.A. of the selected star are set in. Then G.H.A. of Aries is set, and computed altitude is read and recorded. For each subsequent computation, using the same check point (latitude and longitude) and for the star declination and S.H.A. are used, the only resetting necessary being G.H.A. for each value and the corresponding-computed altitude read and recorded.

FIGURES 12 to 21 are illustrations of component sections of an exemplary mechanical analog computer utilized in the invention astrocompass following the principles of the schematic computer showing in FIGURE 11. FIGURE 12 shows the bail support assembly partially in section. The semicircular bail 335 is assembled into a unitary assembly with the true azimuth output gear 308 and a frame structure 340. Frame 340 has extensions 341, 341 which secure rib 342 extending from bail 335 through suitable bolts 343, 343. The frame assembly 341, 341 with ribs 342 and bolts 343 correspond to the schematically indicated mechanical connections 165' to 165' between bail 335 and true azimuth output gear 308 shown in FIGURE 11. The semicircular bail 335 accordingly is rigidly mechanically connected to true azimuth gear 308, whereby rotation of bail 335 about the axis 166 coincident with the center of gear 308 produces the true azimuth bearing indications as set forth hereinabove.

The true azimuth gear 308 is annular form centered by several pin 344 positions and secured firmly to frame 340 by bolts 345, 345. A cylindrical hollow extension 350 integrally extends from the axial central portion of bail frame 340 as seen in section in FIGURE 12. The hollow central portion of cylindrical extension 350 contains altitude output shaft 166 which is rotatably supported therein in bearings 351, 352. A pinion 333 is secured to the internal end of altitude output shaft 166 in the manner of FIGURE 11. Pinion 333 coacts with the geared rack 330 for altitude output. Rack 330 in turn rides along bail 335 as shown in more detail in FIGURES 19 and 20.

The cylindrical extension 350 of the bail support is rotatably mounted in the computer frame and further described in connection with FIGURE 19 hereinafter. A shoulder 353 is incorporated with extension 350 for juxtaposition with a roller bearing support for extension 350, as will be set forth. The outer end of cylindrical 350 is threaded at 354 for mounting a retaining ring to secure the bail assembly within the frame and against an additional roller bearing as will be described hereinafter. The bail assembly 335 is accordingly rotatable in the frame of the computer through cylindrical extension 350, and true azimuth gear output 308 reproduces the angular motion of the bail 335 along the central axis of the bail support including cylindrical extension 350. Further, the rack or carriage 330 which rides along the bail 335 (see FIGURES 19 and 20) rotates the bevelled pinion 333 to in turn rotate the altitude output shaft 166 secured therewith. The altitude output is transmitted at the shaft end 166' to an altitude output gear 172' as seen in FIGURE 19.

FIGURE 13 illustrates the arcuate or rack sector 330 which is arranged to smoothly ride along bail 335. The rack or carriage 330 contains peripheral gear 332 for engagement with the altitude pinion 333 to transmit the altitude movements of the star arm 307, as described in connection with FIGURE 11. The rack 330 has a U-shaped configuration with sides 360, 361 and 362 (see FIGURE 14). These sides are trimmed of surplus areas in a manner to maintain sufficient structural strength for the carriage 330 and yet minimize its weight as indicated by the open spaces 355, 356. Rack 330 is arranged to ride smoothly up and down semicircular bail 335. Towards this end a plurality of rollers in the form of roller bearings are mounted along the carriage 330 to coact with suitable bearing surfaces of the bail 335.

FIGURE 14 is a cross sectional view through one portion of the rack 330 showing its construction and arrangement of one set of the rollers that coact with the bail. The U-shaped frame 360, 361, 362 of carriage 330 has a roller at section 14—14 (FIGURE 14) in each of the three planes corresponding to the U-structure of the carriage 330. A roller 363 is supported in pin 364 extending from post 365 secured in U-frame section 360 by set screw 379. A roller 366 is secured on pin 367 extending from post 368 secured in frame section 360 by nut 369. Roller 266 clears the U-frame portion 361 through opening 370. Bearing 366 though mounted on frame section 360 corresponds to the roller for the intermediate U-frame portion 361. A third roller 371 is supported in pin 372 extending from post 373 secured in U-frame section 362 by set screw 374.

The rollers 363 and 371 are coaxial and spaced across a gap within the U-frame of carriage 330 for coaction with the bail 335. The coaction of rollers 363, 366 and 371 with bail 335 is shown and described in more detail in connection with FIGURE 16 hereinafter. An additional set of three rollers identical to the set 363, 366, 371 of FIGURE 14 is incorporated at the other end of the carriage 330 and indicated at 365' and 369' in FIGURE 13. Additionally three identical sets of twin roller assemblies are arranged along carriage 330 corresponding to those to be shown and described in connection with FIGURE 17. Such additional rollers are shown at 375 in FIGURE 13 with one centrally of carriage 330 and two others at the opposite ends.

Figure 18:
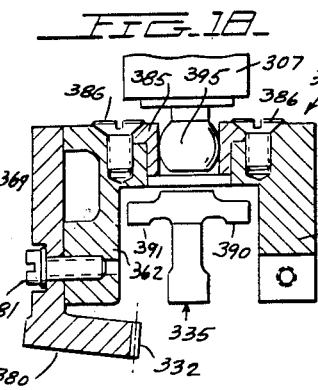

Rollers 375 are utilized to prevent lateral displacement of bail 335 with respect to rack 330 as will be described in connection with FIGURE 17. The rollers 375 are rotatably mounted on pins 376 extending from threaded posts 377 in central portion 361 of the U-frame of rack 330 and each secured with a nut 378. The rack gear 332 is formed in an L-shaped member 380 projecting at a suitable region with respect to the U-shaped rack 330 for coaction with the altitude pinion 333. The gear sector 380 is suitably secured to frame portion 362 of the U-frame as with screws or bolts. FIGURE 18 illustrates the securement of gear sector 380 to U-section 362 with a machine screw 381. Several of such positions with machine screws firmly secure gear sector 380 to the U-framed rack 330.

FIGURE 15 is a plan view of the swivel joint 331' within which swivel head M of the star arm 307 coacts in a manner indicated in schematic FIGURE 11 and more fully illustrated in FIGURES 18 and 19 hereinafter. The swivel head cavity is seen as 383 in FIGURE 13. A cap 385 closes cavity 383 when the swivel head of the star arm is lodged therein. Screws 386, 386 secure cap 385 on the frame portion 361 of rack 330.

Figure 16:
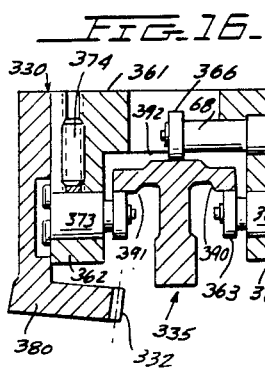
FIGURES 16, 17 and 18 are cross-sectional views through corresponding sections of the exemplary computer shown in FIGURE 19.
Figure 17:
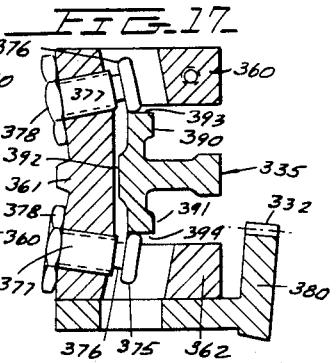

FIGURES 16, 17 and 18 are corresponding cross-sections taken along the assembled rack and bail 330, 335 at the corresponding cross-sectional points in assembly FIGURE 19. FIGURE 16 corresponds to FIGURE 14 described above, with the cross-section of bail 335 seen within U-shaped carriage 330. The coaxial rollers 363, 371 are arranged to coact with corresponding smooth faces of T-shaped bail 335; roller 363 rides on smooth arcuate face 390; and roller 371 on face 391. Central roller 366 rides against the top central machined face 392 of bail 335. The faces 390, 391, 392 of bail 335 are smoothly machined and accurately executed in order that bail 335 ride precisely with respect to the rollers. The positioning rollers 363, 366, 371 are accurately positioned within the carriage 330 to precisely coact with the faces 390, 391 and 392 of bail 335.

The coaction of the bail roller faces 390, 391, 392 and roller sets of rack 330 shown in FIGURE 16 serves to prevent any in-out displacement of carriage 330 with respect to bail 335. Another set of rollers, identical to rollers 363, 366, 371 of FIGURES 14 and 16, are located in a symmetrical position at the opposite end of carriage 330 as shown in FIGURE 13. Thus, in-out displacement of the bail and carriage arrangement 330, 335 is eliminated by these two pairs of rollers while permitting the carriage 330 to ride up and down the bail 335 in accordance with motivations of the star arm described in connection with FIGURE 11.

Transverse displacement of the bail 335 with respect to carriage 330 is avoided by the use of three sets of roller pairs 375, 375 as shown in cross-sectional FIGURE 17. Bail 335 is arranged with smooth outside faces 393, 394 for precise coaction with the rollers 375, 375. The axes of rollers 375 are inclined with respect to the central axis of bail 335 whereby the outer coacting surfaces 393, 394 thereof are also inclined. This enhances the lateral locking of the bail 335 with respect to carriage 330. The three sets of rollers 375, 375 arranged along the carriage 330 have been found to inhibit lateral displacement with respect to the bail and carriage assembly. The rollers of the carriage are preferably arcuate roller bearings to minimize frictional drag on the movement of the carriage 330 with respect to bail 335.

FIGURE 18 is a cross-sectional view through the carriage bail assembly at the swivel joint section, through the line 18—18 of assembly FIGURE 19. The U-framed carriage 330 is mechanically connected with the star arm 307 (see FIGURE 11) through the swivel head 395 projecting from star arm 307. The swivel head 395 is seated within a suitable cap 385 fastened to the frame of carriage 330. Since the radial position swivel head 395 in the mechanism is maintained constant, as is the radial position with respect to the star arm of the common pivotal point of carriage 330, there is no problem about radial displacement between the bail, carriage, and swivel head 395.

The mechanical gyrations executed by the star arm 307 cause the swivel head 395 to motivate the carriage 330 and the bail 335 therewith to execute the required true azimuth displacement of the bail 335 as described in connection with FIGURE 11 and the altitude of the celestial body as executed by the star arm 307 to the carriage position 330 with respect to bail 335. FIGURE 19 is an elevational view, partly in section, through the exemplary analog mechanical celestial data computer 150. The movable analog mechanism of computer 150 is housed in a stationary main frame 400 having a frame extension 401 and a cross bar frame 402. The bail support assembly as illustrated and described in connection with FIGURE 12 is rotatably mounted within the frame extension 401. A sleeve 403 is inserted within the central opening of frame extension 401. Sleeve 403 has a flange 404 which is secured to frame 401 through threaded posts 406 and bolts 407.

The cylindrical extension 350 of the bail support assembly is rotatably supported within sleeve 403 through spaced roller bearings 408, 409. Roller bearing 408 is fitted between shoulder 353 of extension 350 and a shoulder 410 in sleeve 403. Bearing 408 is fitted between shoulder 411 of sleeve 403 and a locking ring 412 fitted upon the extension 354 of cylinder 350. A set screw 413 locks ring 412 in position after suitable assembly. As described hereinabove in connection with FIGURE 12, the altitude shaft 155 extending from altitude pinion 333 is rotatably mounted within the cylindrical extension 350 of the bail support in roller bearings 351 and 352. The shaft 166 extends beyond the retaining ring 412. The shaft extension 166' of altitude shaft 166 has altitude output gear 172' secured thereto. A collar 414 with set screw 415 suitably secures output gear 172' to shaft 166. The altitude output from the computer 150 is thereupon transmitted to pinion 172" and to altitude output shaft 173' (see also FIGURE 11).

Rotation of bail assembly 335 carries with it integrally secured gear 308 which represents the true azimuth output of the computer 150 (see FIGURE 11). An output pinion 167', indicated in dotted lines, is coupled to azimuth gear 308, and transmits the true azimuth output to shaft 168' (see also FIGURE 11).

The interior section of computer 150 constitutes the declination and L.H.A. head assembly movable within the semi-circular bail 335, as seen in FIGURE 19. The rotatable head 305 motivates star arm 307 through depending bracket 306. The motivated star arm 307 displaces the carriage 330 and bail 335 slidably attached thereto through the swivel head connection 395. Displacement of the rack or carriage 330 along the bail 335 causes the altitude pinion 330 to correspondingly rotate through the movement of rack gear 332. An accurate measure of the celestial body altitude, per the computer movements, is accordingly transmitted to the altitude output shaft 173' in the manner already described. This important feature of the invention results in an accurate computer altitude of the selected celestial body, as well as its accurate true azimuth through the corresponding movement of bail 335 about its bail support axis through the cylindrical support extension 350.

Bail 335 moves with its support frame 340 assembly about the axis of the integral cylindrical extension 350 and with respect to the fixed frame work 400, 401 of the computer 150. The corresponding rotation of the gear 308 integral with the bail assembly 335 rotates the pinion 167' to produce the true azimuth output at shaft 168' external of frame 400. The declination displacement is provided in the rotating head assembly 305 through the circular pivoted ends 316' integrally extending from head 305. Head 305, as described in FIGURE 11, is pivotally mounted with respect to the axis of declination shaft 310. The circumference of the surfaces 316' have suitable gear teeth to engage helical gears 317'. Gears 316' and 317' correspond to declination gears 316 and 317 of the schematic system of FIGURE 11.

Rotation of helical gear 317' positions the rotatable head 305 in suitable declination. The declination gear 317' is secured to shaft 300' which in turn is motivated through successive spur gearing including gears 420, 421 corresponding to gear train 301, 302, 303 extending between the declination gears 316, 317 and the input declination gearing 164 to the computer as per FIGURE 11. The latitude cradle 321 rotatably supports the L.H.A. gear 315'. The L.H.A. gear 315' is driven by pinion 326' which is connected to the L.H.A. shaft 149' which extends through the computer to the L.H.A. input gearing 151 (not shown).

Further detailed gearing is omitted from FIGURE 19 for the sake of clarity of presentation of this complex mechanical structure. However, the relationship of such ancillary gearing and their connection external to the frame 400, 401, 402 are as fully represented in the overall schematic computer 150 in FIGURE 11, as will now be evident to those skilled in the art. The declination L.H.A. and the latitude inputs to the computer mechanism result in activation of the rotatable head 305 and star arm 307, all as described in connection with the overall system of FIGURE 11. Resultant true azimuth and altitude outputs are derived at respective output shafts 168' and 173'.

FIGURE 20 is a cross-sectional view through the computer assembly of FIGURE 19 taken along line 20—20 through the engagement of the altitude pinion 333 with rack gear 332. FIGURE 21 is a view taken along the line 21—21 facing this gear and pinion engagement at 332, 333. A fixed roller assembly 425 is secured to the bail frame 340 through machine screws 426, 426. A roller 427 is rotatably mounted within assembly 425, preferably on a roller bearing and at the angle as seen in FIGURE 20. Roller 427 engages with a machined surface 430 of the carriage assembly 330 opposite and parallel to the gear sector 332 thereof. The location of roller 427 is exactly opposite the point of engagement of rack gear 332 with the relatively fixed pinion 333.

It will be recalled in the description of FIGURE 11 that the center point of pinion 333 represents the zenith of the mechanical analog computer 150. The roller 427 is provided to ensure the continuous engagement of the rack gear 332 with the pinion 333. This occurs despite the rotation of the bail support and bail assembly 335 that carries the roller assembly 425 or of the movement of the rack 330 along the bail 335, since the altitude pinion 333 is relatively fixed with respect to the bail assembly 335. The rack assembly 330 moves between roller 427 and the pinion 333 on semi-circular bail 335, ensuring engagement with the rack gear 332 and transmitting the computed altitude of the celestial body to altitude pinion 333.

Sextant prism arrangements

FIGURE 22 is a diagrammatic illustration of three operative positions of the prism 71 as utilized in the sextant 70 (see FIGURE 6). The prism 71 is rotated about point 500 which corresponds to the center of the hemispherical dome 22 (see FIGURE 22). The position of prism 71 corresponding to a 0° star altitude is 71a; that corresponding to 30° start altitude is 71b; that to a 60° star altitude is 71c. The prism 71 of the exemplary embodiment, corresponding to that of FIGURES 6 and 22, is of heavy flint (EDG–4); is a 104° prism, with coefficient N equal to 1.73 at 4,000 A.

Rotation of prism 71 about its altitude axis of rotation 500 produces shifting of the star image beam across the surface of objective lens 103, as is the case of conventional and prior art usage in sextants. To overcome such shifting of the beam, as described in FIGURE 22, a moving corrector lens 105 is placed between dome 22 and tracking prism 71, as shown in FIGURE 6, to negate the optical power of the dome, providing parallel starlight rays entering the prism. Thus, the telescopic optics for the sextant correspond to focusing of an object at infinity.

In the absence of a corrector lens 105, the collimated light from the stars is uncollimated by the dome 22 and passed through the prism 71 with varying ray incident angles dependent upon the thickness and curvature of the dome, the indices of the glass, and the orientation of the prism 71. FIGURE 22 illustrates three basic angular positions of the prism 71 corresponding to angular incidence of the star at 0°, 30° and 60°. The 104° prism 71 when positioned at 71a for the beam 101a for the 0° star altitude has the starlight incident upon its initial surface 501a to produce internal beam 502a. Beam 502a is incident upon point 503a of the rear surface 504a of prism 71a and through refraction produces the internal beam 505a. Beam 505a emerges as the 0° sextant beam 102a in the vertical direction corresponding to beam 102 seen in FIGURE 6.

In a similar manner, the 30° incident starlight beam 101b impinges upon the initial surface 501b of prism 71b. The resultant internal beam 502b impinges upon point 503b of the rear face 504b of the prism at the 30° position. The resultant internal beam 505b emerges as the 30° beam 102b in the vertical direction parallel to the 0° beam 102a. It is to be noted that the 30° beam is displaced to the right of the 0° beam 102a, causing the distortion referred to hereinabove.

In a similar manner, the 60° star beam 101c impinges upon the surface 501c of the prism 71 in its 60° position 71c. The resultant refracted beam 502c impinges upon point 503c of the rear face 504c of the prism. The beam 505c resultant therefrom emerges as the 60° beam 102c parallel to the 30° and 0° beams 102b and 102a, repsectively. It is to be noted that the 60° beam is displaced further to the right with respect to the other two indicated beams.

It is thus clear that in the conventional prism used for sextants that a spread or positional error with respect to the exact vertical occurs for the respective altitude star beams which produces errors in the modulation and interpretation of the star position for the various angles if compensation such as with a moving corrector lens 105 is not utilized. The corrector lens 105 permits the beams 102a, 102b and 102c for the respective altitude angular differences of the stars sighted to emerge at a common central vertical axial point through the corrector and other lens and modulator components of sextant 70.

An important feature of the present invention resides in the novel prism and arrangement therefor in a sextant to obviate the necessity for a correcting lens such as 105 with the sighting prism. Towards this end a 90° prism 510 is utilized with an altitude axis of rotation independent of the center of the hemispheric dome 22, as will now be set forth. The prism position 510a corresponds to the position of prism 510 for a star beam having a 0° altitude with beam 511a impinging upon its initial surface 512a. The resultant beam 513a impinges upon point 514a at the rear surface 516a of prism 510. The resultant internally refracted beam 517a produces an emerging beam 518 for the 0° star altitude in the vertical direction and corresponding to the central star beam 102 of FIGURE 6.

The prism 510 is rotatable within hemispheric dome 22 about a particular axis of rotation which is point 515 at the rear surface 516 common to the respective prism positions. In other words, the common point 515 is on the rear face of the prism 510, and the prism rotates thereabout as the altitude axis of rotation, the center of the hemispherical dome being at 514a. About rotational axis 515 prism 510 is rotated 30° to intercept the beam 511b from the 30° star altitude. Beam 511b impinges upon initial surface 512b in prism position 510b, producing the refracted internal beam 513b which impinges upon point 415b at the rear surface 516b. The further refracted beam 517b emerges from prism position 510b in the identical beam path 518 corresponding to the star 0° and other altitudes beam emerging position.

In a similar manner, the 60° altitude beam 511c impinges upon the surface 512c of prism position 510c, producing the internally refracted beam 513c. Beam 513c impinges at point 514c on the rear face 516c of the prism. The refracted beam 517c resultant therefrom causes emerging 60° beam on the common 518 path. It is thus noted that the full range of the star altitudes results in a common beam 518 for all the angles and that this is accomplished with a single axis of rotation 515 for all the altitudes.

An exemplary prism 510 for this purpose is a 90° prism of light crown glass (UBK–7) having a coefficient N equal to 1.53 at 4,000 A. Other prism designs and parameters are feasible within the principles of this invention having a common altitude of axis rotation with the star autitude beams impinging at different angular positions with respect to the initial face 512 thereof and emerging in a common beam (vertical position 518) centrally of the sextant for accurate modulation and position determinations. Such system requires no corrector lens. The axis of rotation 515 is through the hypotenuse 516 of the right-angled prism 510. A symmetrical prism image results which does not significantly vary the ray incidence or position with altitude, being the beam 518 for the objective lens 103. The aforesaid description of the prism 510 utilization in producing a single output beam for all star altitudes is, of course, feasible for sighting planets and the sun, as well as the stars.

*Sun tracking mode of operation*

In prior art astrocompass equipment, a 60 cycle shutter signal is generally used for sun tracking without the aid of the carrier signal (see aforesaid patent applications). In practice, the sun's image is too large for proper carrier frequency generation by the raster lines. As a result, separate sun signal channels have been used to provide sun position error information to the servo systems of the equipment. In addition, relatively large photo-cathode area illumination by the sun image makes the astrocompass system prone to double null signal confusion.

In accordance with the present invention, both electrical and optical systems are provided to avoid the need for such second channel, and only the single channel system as used for the stars and planets is utilized and with better results. For example, a perforated metal disc 575, indicated in dotted lines in FIGURE 24 and described hereinafter in connection with FIGURES 26 and 27, avoids the need for a second sun control channel. Also as shown and described in connection with FIGURES 24 and 25, a novel photo-multiplier conversion circuit renders the use of a critical filter system and extreme light shielding unnecessary.

Referring now to FIGURE 24, the photoelectric sextant 70, corresponding to that shown in FIGURE 6, has a photomultiplier tube 525 at the emergent carrier-modulated beam 108' from objective lenses 111 at output prism 109. As described in connection with FIGURE 6, the beam 102 emergent from the rotatable prism passes through the center lens 104 as beam 102' to sun filter 130, field stop 131, raster wheel 106, and shutter disc 107. The use of the sun filter 130 alone in the prior art resulted in a signal beam 108' which was too luminous for a normally connected photo-multiplier tube (see application Serial No. 321,696). The usual filter 130 and field stop 131 necessitate critical design, subject to minute light leaks and variation in optical density, producing relatively poor results with normal photo-multiplier connections for sun measurements.

In accordance with the present invention, a single channel is used for both the amplification and signal control of the sextant 70 for either sun or star observations. Toward this end, the photo-multiplier tube 525 when used for sun sighting is arranged to be connected as a single stage photo-diode tube rather than as a multi-stage photo-multiplier. It is well established that the star and sun illumination upon a detector is known to differ in intensity by a factor of the order of $10^{11}$. The use of a single detector for both intensity measurements required a filter system which afforded an attenuation of this order and, therefore, a second type of detector was utilized for sun tracking which would be operable at higher light levels and render the system practical. This, of course, required a second channel as stated above.

Photo-multiplier tube 525 in FIGURE 24 is connected as a diode tube and operates in a manner similar to a photo-cell, namely as a single stage tube having a photo-sensitive cathode and a single anode. The photo-multiplier 525 utilized for star signal amplification is in the exemplary embodiment commercial type 1P21. Its operation as a diode entails the connection of its anode and dynode electrodes, together to a voltage source of not more than 70 volts, 67 volts being satisfactory. Towards this end, the photo-sensitive cathode 526 of photo-multiplier tube 525 has emergent modulated beam 108' impinging thereon and directs the released electrons toward the fixed anode electrode 527 at the opposite end. A plurality of spaced dynode electrodes 528 are between the cathode 526 and anode 527, as is understood by those skilled in the art.

In the embodiment of FIGURE 24, utilizing the tube 525 as a single stage photo-cell, a multi-pole switch 530 is connected to each of the dynode electrodes 528. Each blade of switch 530 is connected to a terminal 531, which in turn are all interconnected by common lead 532 to terminal 533 of switch blade 534. Lead 532 is in the position of FIGURE 24 connected through switch blade 534 to lead 535 and anode electrode 527. In the indicated position, all the dynode electrodes 528 and the anode 527 are interconnected electrically. Also, the tapped resistance 550 which normally supplies the incremental voltages to the dynode electrodes 525 is entirely disconnected therefrom. Lead 535 also connects to switch blade 536 to the output terminal 537 of the photocell circuit. A jumper 538 interconnects switch blades 534 and 536.

Lead 537 from the anode 527 connects to the photocell amplifier output lead 540, which in turn connects to the amplifier 112 of the astrocompass system through a blocking condenser 541. A tuned circuit comprising inductance 542 and parallel condenser 543 is proportioned to be resonant at the carrier modulated frequency, corresponding to the modulation of the light beam 108' by the raster-shutter combination 106, 107 for efficiently passing the photo-amplifier signals to amplifier 112. The switch 544, in the indicated position, connects the ground potential to the positive side of the battery $E_2$ through contact 545. The negative side of battery $E_2$ connects through lead 546 and switch 547 and through contact 548 and to the lead 549 to photo-cathode 526.

Thus, with the switch blades 544 and 547 in the position indicated in FIGURE 24 and ganged to the multiple switch 530 and switch 534, 536, the photo-multiplier tube is presented as a single stage photo-cell amplifier. The battery $E_2$ is at 67½ volts and connects the cathode to the $E_2$ voltage below ground. The dynode electrodes 528 are interconnected through switch 530 to cathode 527 and in turn through switch 534, 536 to the output lead 540 of the system. The tapped resistance 550 and the high voltage source $E_1$ remain disconnected in the FIGURE 24 mode for sun operation.

Zenithal sun illumination upon the earth is about 85 lumens per square inch. For a 2 inch diameter aperture, 267 lumens are collected and focused upon the photocathode without consideration of losses by the optics and raster system which may, of course, reduce this flux density by as much as 90 percent. The necessary filter attenuation to permit only .005 lumen transmission to the cathode is therefore of the order of $5 \times 10^4$. Such illumination provides adequate sensitivity and reliable operation of the photo-multiplier connected as a simple photo-diode. Using a filter glass 0.030 inch thick of NG–1 filter glass offers an attenuation near the $5 \times 10^4$ value.

The single stage multiplier operation as set forth, offering a simple mode for sun tracking, provides the following advantages: (1) the necessary filter attenuation in the system is reduced by a factor of about 10⁶. This is very important in avoiding extraneous and parasitic readings and errors when the sun is tracked and reducing the cost and complexity of the optics in the sextant 70. (2) The photo-current output of the multiplier system 525 at lead 540 is at the same order of magnitude as that in the star tracking mode. Thus, no significant electronic change is needed beyond the switching of the photo-multiplier 525 from normal multiplier circuital connection (see FIGURE 25) to its single stage diode connection (see FIGURE 24). (3) The signal intensity variation of the system is accordingly maintained relatively constant, which provides optimum circuit design and utilization of the equipment for the several modes of operation.

FIGURE 25 shows in simplified form the interconnection of the photo-multiplier 525 in its normal operation for the minute or low level optical intensity beam 108′ as derived from star images. The multiple switch 530 is in the horizontal position, engaging with the associated contacts 551 connecting the respective electrode dynodes 528 through leads 552 to different positions along tapped rheostat 550. Rheostat 550 is connected by its associated terminals 553, 554 across the high voltage source $E_1$ which in the exemplary embodiment totalled 900 volts. It is noted that in the star mode of FIGURE 25, only one contact 531 is shown for purposes of clarity of illustration, and interconnecting lead 532 remains unconnected to either the dynodes 528 or the anode electrode 527 in view of this position of switch 534 engaging contact 561 and leaving contact 533 open.

An additional contact 562 is used to complete the switch 536 action. The anode 525 is accordingly directly connected through lead 535 and switches 534, 536 to lead 537 and output lead 540 through condenser 541. The anode 527 is thus also connected to ground potential through the inductance 542. The battery $E_1$ in turn renders the respective dynode electrodes 528 at successively greater negative potential with respect to anode 527 in view of their successive tapped connections along resistance 550 through associated leads 552 through the switch blades 530. The cathode electrode 526 is in turn connected to the negative terminal of the battery $E_2$ through the contact 560 and the switch blade 547 through lead 549. Thus, the cathode is at the extreme negative potential of the $E_1$ magnitude and with respect to ground and in turn is at the same voltage difference and negative with respect to the anode electrode 527 which is grounded, as is usual in photo-multiplier circuitry.

It is noted that with contact terminals 545 and 548 unengaged, the low-voltage battery $E_2$ is out of circuit with photo-multiplier 525. The electrical connection of the photo-multiplier 525 and its action on star beam 108′ for the star tracking mode are the same as shown and described in connection with FIGURE 1 of the aforesaid patent application Serial No. 321,696.

The various switches of the system of FIGURES 24 and 25 are preferably ganged together for unitary and simplified operation in conversion of the modes of operation from the star to sun tracking and vice versa. Towards this end, the switches 530 are coupled to switches 534, 536 and 537 through linkage 555 indicated in dotted lines in FIGURE 25. Linkage 555 is in turn coupled to the lever indicated in dotted lines at 556, which is pivoted or fulcrumed at 557. A lever 558 also connects lever 556 with the switch blade 544. While the interconnection of photo-multiplier 525 from its fully effective amplification of star signals as the normal mode of FIGURE 25 to the single stage photo-cell mode of FIGURE 24 for sun or bright signal observation has been illustrated for exemplary purposes, it is to be understood that variations in such interconnection, for the purposes described, may be made without departing from the scope of the invention set forth.

FIGURE 26 is a plan view of the perforated thin opaque disc 575 used in conjunction with a sun filter 130, as referred to above. The opaque perforated disc 575 is indicated in dotted lines in position in sextant 70 in FIGURE 24. Its position may be contiguous with sun filter 130 and mounted therewith with a common ring 580, or may be positioned in the optical axis near the plane of the raster on wheel 106. A typical raster for disc 106 is shown in partial view, FIGURE 24A. The raster comprises a series of alternate opaque and transparent radial "lines" or areas 106′ in an annular region around disc 106. The function of raster lines 106′ is to interrupt the celestial light beam 102′ as disc 106 rotates at its predetermined rate. The carrier frequency signal referred to is generated by such beam interruption action. The resultant carrier frequency is equal to the disc (106) revolutions per second multiplied by the total number of raster lines (106′), divided by two, as is well known in the art. The disc 575 may be of thin metal and is perforated with appropriately spaced "small sun image" apertures 576. The small apertures 576 may have diameters approaching the raster widths on wheel 106, namely the width of radial raster lines 106′, so that the new sun images so produced are capable of good carrier frequency generation therewith.

In other words, in prior systems the sun image is too large for proper carrier frequency generation through the raster lines 106′. The use of the small sun apertures 576 provides a multiplicity of sun images of proper size to impinge upon the raster of disc 106 and in turn generate suitable carrier frequency signals corresponding to the sun's image without distortion or confusion in the resultant tracking thereof. Also, the use of the plurality of minor images which may be readily modulated by the carrier disc and shutter combination 106, 107 permits a single tracking channel for both sun and the star tracking, as aforesaid. The use of the disc 575 together with the sun filter 130 and also the single-stage photo-electric amplifier connection of photo-multiplier 525 (as illustrated in FIGURE 24) renders the sextant system design simpler, lighter in weight, and more efficient than heretofore possible, as will now be understood by those skilled in the art.

The perforated disc holes 576 may be separated by about one-half of the diameter of the sun's image in the system e.g. every 16′ of arc. Of course, different diameters and spacings for the "small sun image" apertures 576 are feasible for corresponding results. FIGURE 27 is a cross-sectional view of the composite sun filter perforated disc 130—575 of the exemplary embodiment.

*Self correction in position for the automatic astrocompass*

With the advent of true altitude measurement provided by the invention automatic astrocompass, it becomes possible to establish lines of position from which fix positions, wind velocity and drift and ground speed parameters may be derived. Manual or automatic modes of utility may be employed in the application of altitude and relative bearing information to the above results. Thus, the astrocompass may be constrained to provide accurate true heading without the need of extra position fixing apparatus.

For manual utility a navigator is required to interpret the data supplied by the tracker, in which case the equipment is used as an automatic self-computing sextant. With an auxiliary data computer added to the tracker computer, self-correction may be continuous or periodic depending upon the requirements of the auxiliary unit. A continuous correction incorporates a dead reckoning feature into the unit with the following inputs:

(a) True heading
(b) True air speed
(c) Star azimuth (or relative bearing)
(d) Latitude and longitude of assumed position
(e) Difference of observed and computer altitude
(f) Time The computer would then provide the following outputs:

(g) Ground speed
(h) Instantaneous longitude and latitude
(i) Ground track made good
(j) Wind velocity and drift The dead reckoning feature operates through using the true heading and true air speed in place of ground speed and track made good, unless corrections are applied from observed and computer altitude differences as related to latitude and longitude difference.

A periodic correction operational mode includes a simplification of the continuous auxiliary computer into a unit which receives the same inputs (expecting time and longitude) and supplies a periodic output of only differences in instantaneous latitude and longitude which are applied to the astrocompass computer. The accuracy of functioning of such periodic correction is determined by the angular relations of relative bearing and star azimuth to the observed data. For example, star relative bearings which are taken along the longitudinal axis of the aircraft or perpendicular to this axis may provide lines of position which can effectively be interpreted with respect to the aircraft for true heading or the star azimuth.

It is not necessary herein to know the true heading beyond an accuracy of several degrees, initially, depending upon the star altitudes used (lower altitudes affording larger true heading tolerances).

The frequency of periodic correction to the indicated latitude and longitude cannot be fixed since it depends upon the relations of the stars involved in tracking. The following set of rules $(a)$, $(b)$ and $(c)$ assures sufficient accuracy for the self-correction features; i.e., tracking of stars continues normally with no corrections to latitude or longitude, unless one of the following occurs:

Rule $(a)$: Local hour angle = 0° or 180° ± 15°
Rule $(b)$: True azimuth = 90° or 270° ± 15°
Rule $(c)$: Relative bearing = 0°, 90°, 180°, 270° ± 15°

It is desirable to alternately utilize at least two stars for fix information whose azimuths differ by approximately 90°.

For rule $(a)$ the correction is applied only to latitude.
For rule $(b)$ the correction is applied only to longitude.
For rule $(c)$ the correction is applied both to latitude and longitude as a function of relative bearing, latitude region and difference in measured and computed altitude. In this case the fix position is found by using the relations that the change in latitude and longitude is taken either along the true heading direction or along the star azimuth direction.

Referring now to FIGURE 28, there is illustrated the rule $(c)$ solution for obtaining fix information in which the following sequence occurs:

(1) When the aircraft is at position T but assumed to be at position S, $LOP_1$ is found and S' becomes the second assumed position (altitude difference advanced along star azimuth $Zm_1$).

(2) A second star measurement is made as soon as possible, with S' at the new assumed position (aircraft has now advanced to T'), and $LOP_2$ is determined. The altitude difference is now advanced parallel to the true heading to S''. Hence, positional error has been diminished from ST to S''T' in the period needed for observations upon two stars.

Generally, lower altitude stars are preferred for all fixing information. Alternate use with a second star pair (perhaps under rules $(a)$ and $(b)$) would serve to reinforce the positional trend (as effected by wind conditions) given by the first. For the comparatively short distances involved in correcting for position, it is sufficiently accurate to use plane trigonometry in the solution for change of latitude and longitude.

For advance latitude and longitude along true heading, the following relations hold:

(a) Distance along $TH$
$$=\frac{\text{altitude difference}}{\text{cos. rel. brg.}} = (\text{lat. diff.})^2 + (K \text{ long. diff.})^2$$

where K is the latitude constant.

(b) $$\tan TH = \frac{K \text{ longitude difference}}{\text{latitude difference}}$$

for advancing along star azimuth.

(c) Distance along azimuth
$$= \text{altitude difference} = (\text{lat. diff.})^2 + (K \text{ long. diff.})^2$$

(d) $$\tan \text{star azimuth} = \frac{K \text{ longitude difference}}{\text{latitude difference}}$$

Solutions of the above sets of simultaneous equations provide proportional changes of latitude and longitude in the proper directions. Rapidity in the utilization of star data governs the fix accuracies which result. The use of star sights which provide exact latitude or longitude measurements is unnecessary for the above functional requirement but would aid toward a simplicity in fix determinations.

For any stationary position upon the earth, the frequency of meridianal passage of trackable stars (of brightness greater than Polaris) is as an average about one star per 5° of earth rotation. Such frequency varies with relative observer motion upon the earth so that the number of stars which pass an aircraft's meridian of longitude is a random affair. Aircraft velocities and locations decide the rate of change of star hour angle which will exist. As an example, an aircraft travelling at a true heading of 90° and a speed of 900 knots at the equator would encounter a star in its meridian at a rate of one every ten minutes of time (2½° of hour angle). The rate at a 60° latitude (N or S) would be about one at each 6½ minutes for the same velocity.

Although the present invention has been described and illustrated with an exemplary embodiment and preferred mode of operation, it is understood not to be so limited since changes and modifications may be made therein which are within the full intended scope of the invention as defined by the appended claims.

We claim:

1. A celestial tracking system comprising optical means for selectively sighting the sun and stars, a photomultiplier tube having a photosensitive cathode, an anode and a plurality of intermediate dynode electrodes, the light output of said optical means being arranged to impinge upon said photosensitive cathode, circuit means connecting said photomultiplier tube as a high-gain amplifier with individual incremental potentials applied to the dynode electrodes for amplifying low light flux signals from stars, and switching means associated with said circuit means to remove said individual dynode potentials and convert said photomultiplier tube to a relatively low-gain amplification mode for the high light flux signals of the sun.

2. A celestial tracking system as claimed in claim 1, in which the switching means is arranged to interconnect the dynodes and connect them to the anode, and to substantially reduce the potential applied to the anode.

3. A celestial tracking system as claimed in claim 1, further including a light attenuation filter insertable in the optical means when said photomultiplier amplifier circuit is converted to the low-gain mode.

4. A celestial tracking system as claimed in claim 1, further including means for interrupting the optical means light beam output at a predetermined rate, and an opaque sheet containing a multiplicity of light transmitting apertures insertable in the light path between said light interrupting means and the optical means upon sighting of the sun, said apertures being proportioned to provide a plurality of images of the sun for individual interruption at said predetermined rate prior to their impingement upon said photosensitive cathode.

5. A celestial tracking system as claimed in claim 4, in which said light interrupting means comprises a rotatable disc with an annular pattern of alternate light transmitting and opaque areas, and in which the apertures are proportioned to provide the images of the sun at the annular areas with diameters substantially equal to the effective widths of said areas.

6. A celestial tracking system comprising optical means for sighting the sun, means for interrupting the output sun light beam from the optical means at a predetermined rate, an opaque sheet containing a multiplicity of light transmitting apertures in the light path between said light interrupting means and the optical means; said apertures being circular and proportioned to provide light corresponding to a plurality of sun images for individual interruption at said predetermined rate, and a photoamplifier for the interrupted sun images to create positional signals of the sun.

7. A celestial tracking system as claimed in claim 6, in which said light interrupting means comprises a rotatable disc with an annular pattern of alternate light transmitting and opaque areas, and in which the apertures are proportioned to provide images of the sun at the annular areas with diameters substantially equal to the effective widths of said areas.

References Cited in the file of this patent

UNITED STATES PATENTS

| | | |
|---|---|---|
| 2,421,012 | Chew | May 27, 1947 |
| 2,541,060 | Hester et al. | Feb. 13, 1951 |
| 2,713,134 | Eckweiler | July 12, 1955 |